US012808247B2

(12) United States Patent
Beggs et al.

(10) Patent No.: US 12,808,247 B2
(45) Date of Patent: Nov. 24, 2026

(54) METHODS AND APPARATUS TO ADJUST DOOR OPERATIONS IN RESPONSE TO SURFACE PRESSURE LOADS

(71) Applicant: RITE-HITE HOLDING CORPORATION, Milwaukee, WI (US)

(72) Inventors: Ryan Beggs, Dubuque, IA (US); Nicholas John Casey, Cascade, IA (US); James Pelegrin, III, Dubuque, IA (US); Derek Lewan, Hazel Green, WI (US); Ryan Pfaff, Dubuque, IA (US); Steven Hart Campbell, Peosta, IA (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 495 days.

(21) Appl. No.: 17/737,650

(22) Filed: May 5, 2022

(65) Prior Publication Data

US 2022/0356742 A1 Nov. 10, 2022

Related U.S. Application Data

(60) Provisional application No. 63/185,832, filed on May 7, 2021.

(51) Int. Cl.
*E05F 15/40* (2015.01)
*E05F 15/668* (2015.01)

(52) U.S. Cl.
CPC ............ *E05F 15/40* (2015.01); *E05F 15/668* (2015.01); *E05Y 2201/22* (2013.01); (Continued)

(58) Field of Classification Search
CPC .... E05F 15/40; E05F 15/668; E05Y 2201/22; E05Y 2400/326; E05Y 2400/36; E05Y 2400/502; E05Y 2900/132
See application file for complete search history.

(56) References Cited

U.S. PATENT DOCUMENTS 5,353,859 A 10/1994 Oltahfer et al.
2004/0164693 A1 * 8/2004 Murray .................. E05F 15/41 318/286

(Continued)

FOREIGN PATENT DOCUMENTS

CN 108119044 A 6/2018
EP 2984271 B1 2/2016

(Continued)

OTHER PUBLICATIONS

Translation of Kitamura has been attached.*

(Continued)

*Primary Examiner* — Zoheb S Imtiaz
(74) *Attorney, Agent, or Firm* — Hanley, Flight & Zimmerman, LLC

(57) ABSTRACT

Methods and apparatus to adjust door operations in response to surface pressure loads are disclosed. An apparatus includes sensor feedback analyzer circuitry to detect a surface pressure load acting on a door based on feedback from a sensor. The door includes a panel to move along a track. The apparatus also includes operations controller circuitry to control operations of the door. The operations controller circuitry is to automatically adjust an operation of the door in response to detection of the surface pressure load.

19 Claims, 19 Drawing Sheets

(52) U.S. Cl.
CPC ..... *E05Y 2400/326* (2013.01); *E05Y 2400/36* (2013.01); *E05Y 2400/502* (2013.01); *E05Y 2900/132* (2013.01)

(56) References Cited

U.S. PATENT DOCUMENTS

| | | | | |
|---|---|---|---|---|
| 2008/0110580 | A1* | 5/2008 | Hoerner | F25D 23/021 160/113 |
| 2010/0032105 | A1* | 2/2010 | Drifka | E05D 15/165 160/310 |
| 2010/0326184 | A1 | 12/2010 | Mugnier et al. | |
| 2012/0241109 | A1* | 9/2012 | Drifka | E06B 9/13 160/264 |
| 2014/0110064 | A1* | 4/2014 | Eggert | E05F 15/48 324/207.13 |
| 2019/0234131 | A1 | 8/2019 | Seadia | |
| 2020/0173231 | A1* | 6/2020 | Drifka | E06B 9/13 |
| 2021/0090427 | A1* | 3/2021 | Hass | G08B 25/006 |
| 2022/0018187 | A1* | 1/2022 | Gregoriou | E06B 9/581 |
| 2023/0203876 | A1* | 6/2023 | Gregoriou | E06B 9/68 160/7 |
| 2024/0125165 | A1* | 4/2024 | Wu | E05F 15/70 |

FOREIGN PATENT DOCUMENTS

| | | | |
|---|---|---|---|
| JP | 2001173345 | * | 6/2001 |
| JP | 2001173345 | A | 6/2001 |
| JP | 2005042400 | A | 2/2005 |
| JP | 2006266025 | A | 10/2006 |
| JP | 2008007973 | A | 1/2008 |
| JP | 4677594 | B1 | 4/2011 |
| JP | 201440712 | A | 3/2014 |
| JP | 2016518542 | A | 6/2016 |
| JP | 6006521 | B2 | 10/2016 |

OTHER PUBLICATIONS

International Searching Authority, “International Search Report,” issued in connection to International Application No. PCT/US2022/027814, mailed on Sep. 26, 2022, 7 pages.

International Searching Authority, “Written Opinion of the International Searching Authority,” issued in connection to International Application No. PCT/US2022/027814, mailed on Sep. 26, 2022, 8 pages.

International Searching Authority, “International Preliminary Report on Patentability,” issued in connection with International Patent Application No. PCT/US2022/027814, issued on Oct. 24, 2023, 9 pages.

European Patent Office, “Communication pursuant to Article 94(3) EPC,” issued in connection with European Patent Application No. 22725620.3, dated Nov. 20, 2025, 9 pages.

Japanese Patent Office, “Notice of Reasons for Refusal,” issued in connection with Japanese Patent Application No. 2023-568463, dated May 12, 2026, 13 pages. [English Translation Included].

Japanese Patent Office, “Search Report by Registered Search Organization,” issued in connection with Japanese Patent Application No. 2023-568463, dated Mar. 6, 2026, 42 pages. [English Translation Included].

* cited by examiner

METHODS AND APPARATUS TO ADJUST DOOR OPERATIONS IN RESPONSE TO SURFACE PRESSURE LOADS

RELATED APPLICATION(S)

This patent claims priority to U.S. Provisional Patent Application No. 63/185,832, which was filed on May 7, 2021, and which is hereby incorporated herein by reference in its entirety.

FIELD OF THE DISCLOSURE

This disclosure relates generally to doors, and, more particularly, to methods and apparatus to adjust door operations in response to surface pressure loads.

BACKGROUND

A variety of power-operated doors have movable door panels for selectively blocking and unblocking a passageway through a doorway. Door panels come in various designs and operate in different ways. Examples of some door panels include a rollup panel (e.g., pliable or flexible sheet), a rigid panel, a flexible panel, a pliable panel, a vertically translating panel, a horizontally translating panel, a panel that translates and tilts, a swinging panel, a segmented articulated panel, a panel with multiple folding segments, a multilayer thermally insulated panel, and various combinations thereof including multiple panels.

Figure 1:
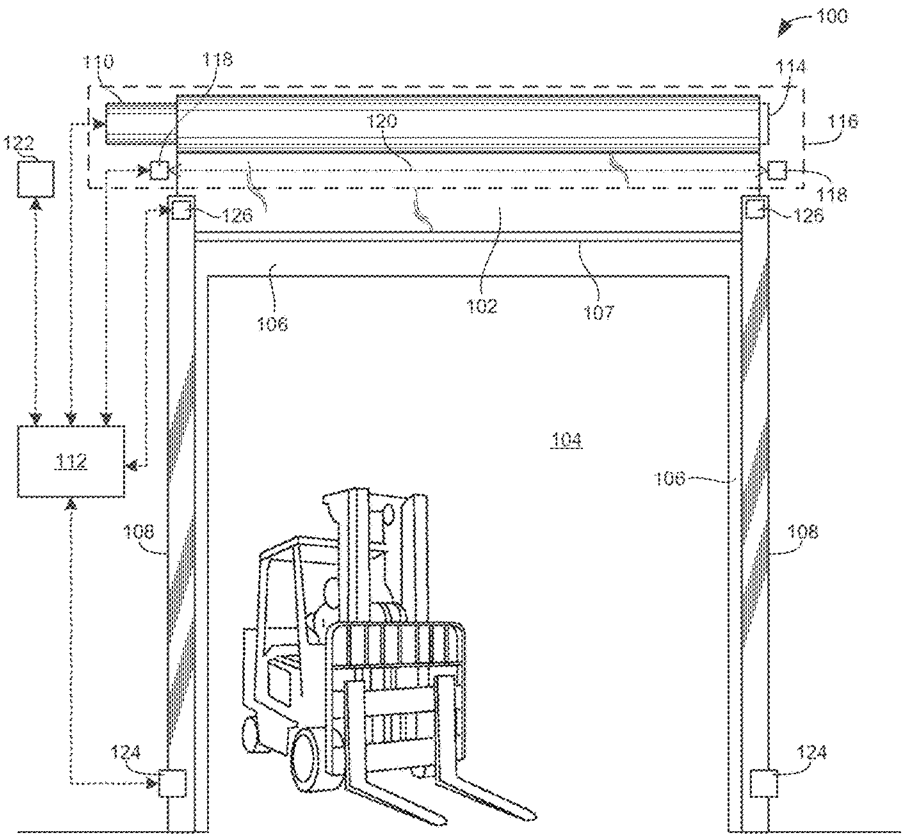
FIG. 1 illustrates an example door constructed in accordance with teachings disclosed herein with an example door panel in an example fully open position.

The figures are not necessarily to scale. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time +/−1 second.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Industrial power-operated door systems are frequently used in warehouses, material handling facilities, and other industrial settings. Often, such power-operated doors are positioned along exterior walls of a facility to provide access into and out of the facility and/or to enable materials to be moved in and out of the facility (e.g., at a loading dock). Doors on an exterior wall of a building are exposed to the outside environment and any associated weather conditions. One common weather condition is wind, which can have a significant impact on the operation of power-operated doors. For instance, many vertically and/or horizontally translating doors open and close along tracks that define a path of travel for a door panel as the door panel moves between an open position and a closed position. These tracks extend generally parallel to a plane of the door panel when in the closed position. As a result, a wind load acting on a surface of the door panel generates a force applied in a direction transverse to a movement of the door panel. Such transverse forces, which can be especially significant for large door panels, can significantly add to friction forces within the tracks. The relatively high friction forces due to wind loads can place added stress on motors and/or associated drive systems (e.g., transmission systems) used to move door panels between the open and closed positions. In some instances, the friction forces can be sufficient to entirely stop movement of the door panel (or at least stop a portion of the door panel from moving while a separate portion continues to move, thereby causing bag-up issues).

While wind loads typically occur at exterior doors, high pressure differentials that impose a pressure load across the surface of a door can occur in other settings (e.g., within different areas within a building, within a mine, etc.) that can also create similar situations to wind acting on an interior door. As such, teachings disclosed herein are not limited to exterior doors under high wind conditions, but can be suitably adapted to any type of door at any suitable location where relatively high pressure differentials may occur (e.g., across a door or between a first surface of the door and a second surface of the door opposite the first side). For purposes of this disclosure, any pressure loads (e.g., due to wind, pressure differentials, etc.) that act on the surface of a door panel to increase friction between edges of the door and corresponding guide tracks are referred to herein as surface pressure loads.

Examples disclosed herein alleviate the above issues by automatically adjusting the operation of doors in response to high surface pressure loads and/or other high friction situations. As used herein, the term "high" in the context of high surface pressure loads and/or high friction situations is defined to satisfy (e.g., exceed) any suitable threshold (e.g., a pressure differential threshold, a force threshold, etc.). In some examples, the operation of the door can be adjusted by reducing an operational speed at which the door moves to an open position and/or a closed position. In some examples, the operation of the door can be adjusted by reversing a direction of the door. In some examples, the operation of the door can be adjusted by preventing the door from moving until surface pressure load conditions improve or reduce (e.g., detected wind speed drops below a threshold). In some examples, an operation of the door includes automatically activating and/or deactivating wind locks based on surface pressure load (e.g., wind) conditions. For example, operation of the door can be prevented from moving via the wind locks until surface pressure load conditions improve (e.g., detected wind speed does not exceed a threshold).

In some examples, the presence and/or speed of wind or other surface pressure load may be detected directly using a suitable sensor (e.g., an anemometer, a differential pressure sensor, an air flow sensor, etc.). Additionally or alternatively, in some examples, relatively high surface pressure load conditions may be inferred and/or calculated based on feedback from other sensors and/or components associated with the door during operation. For instance, detecting that the actual speed of the door (e.g., by an encoder) is significantly less than the commanded speed for the door can be used to infer that a surface pressure load is causing the door to slow down. Furthermore, in some examples, the rate of deceleration in the actual door speed can also be monitored to distinguish between slower speeds due to the door panel hitting an obstruction (indicated by a relatively rapid deceleration in door speed) and an increase in surface pressure load (indicated by a more gradual deceleration in door speed). Additionally or alternatively, an increase in the current drawn by a motor actuating movement of a door panel can indicate that a surface pressure load is present because the motor is having to work harder to overcome the added friction resulting from the wind. Further, in some examples, a bag-up sensor in a header of the door can detect whether the door panel is bagging up to infer that a surface pressure load is preventing the door from opening as it normally would if the surface pressure load were not present.

Figure 2:
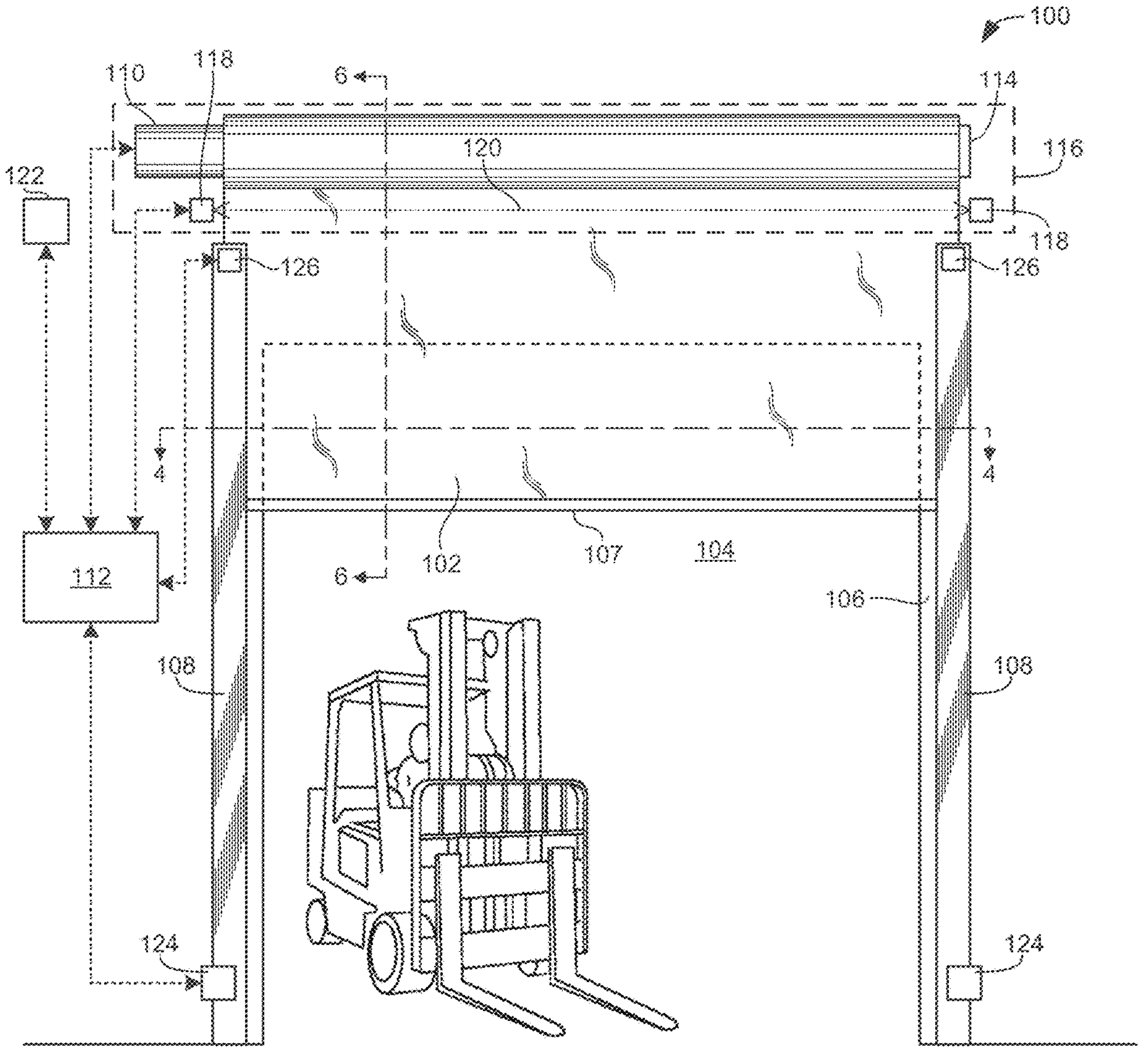
FIG. 2 illustrates the example door of FIG. 1 with the example panel in an example partially closed position.
Figure 3:
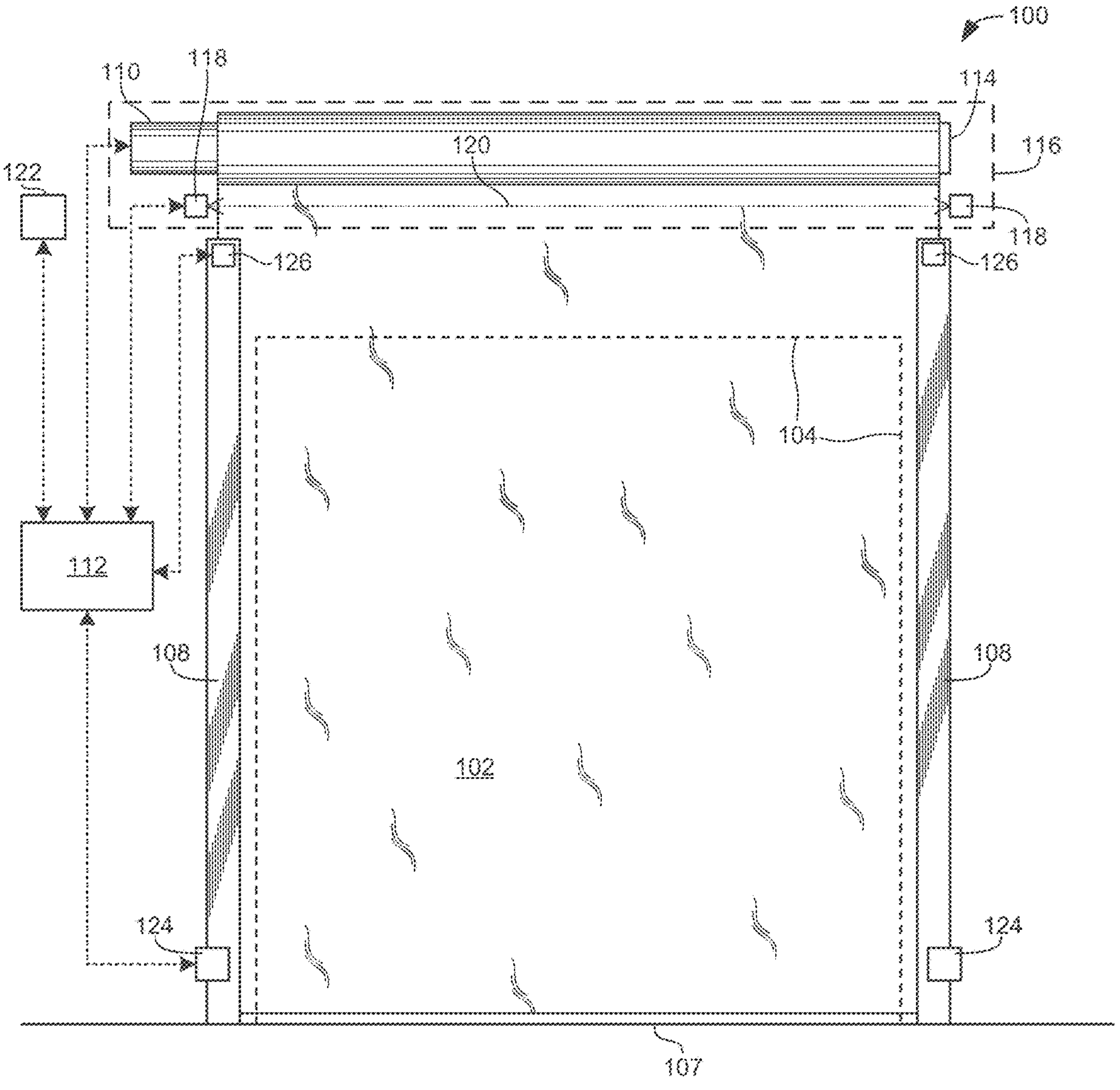
FIG. 3 illustrates the example door of FIG. 1 with the example panel in an example fully closed position.
Figure 4:
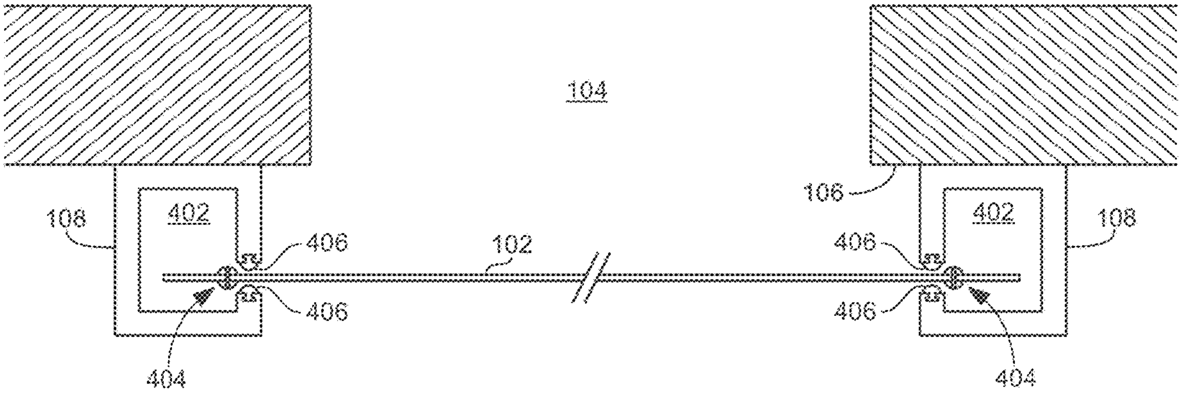
FIG. 4 is a cross-sectional view of the example door of FIG. 1 taken along the line 4-4 of FIG. 2.
Figure 5:
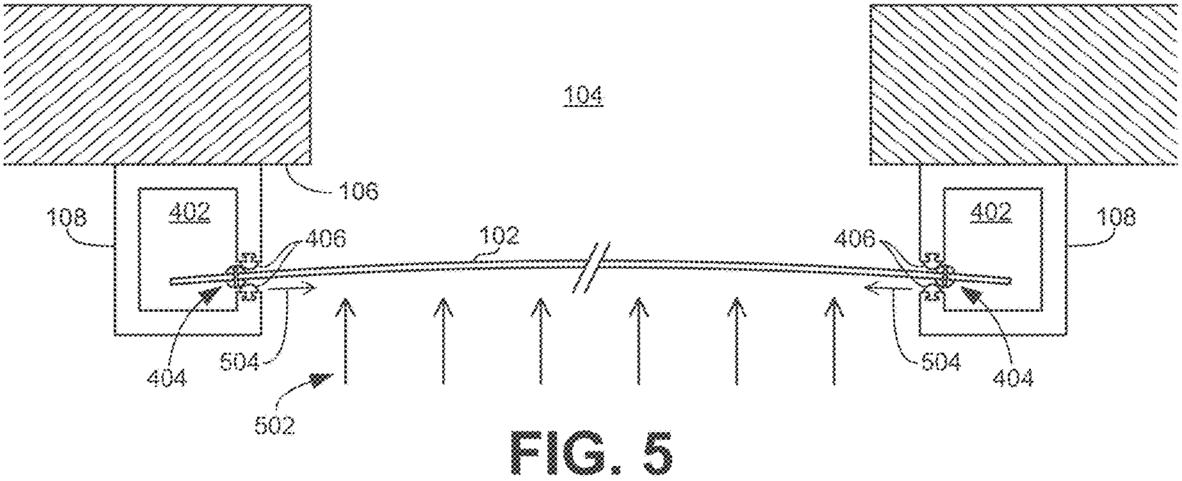
FIG. 5 is similar to the cross-sectional view of FIG. 4 but showing the example door subject to a surface pressure load.
Figure 6:
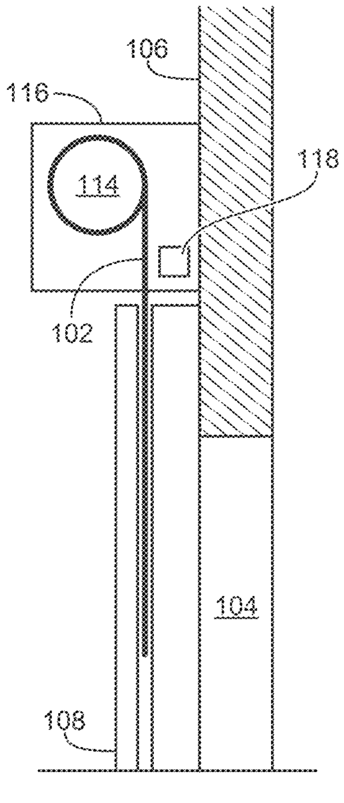
FIG. 6 is a cross-sectional view of the example door of FIG. 1 taken along the line 6-6 of FIG. 2.
Figure 7:
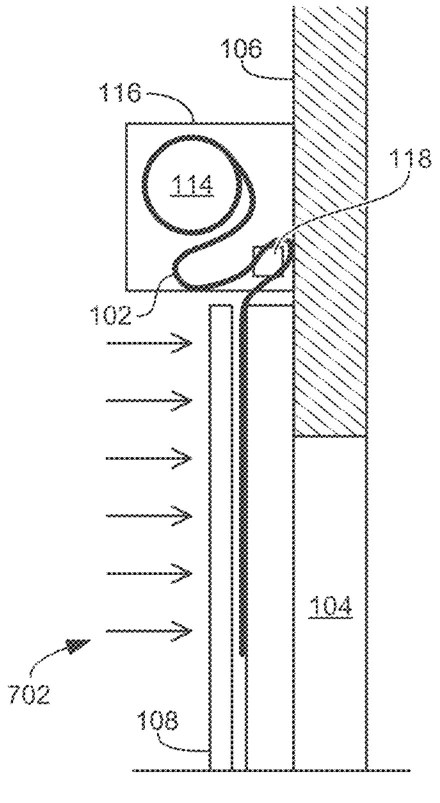
FIG. 7 is similar to the cross-sectional view of FIG. 6 but showing the example door subject to a surface pressure load.

FIGS. 1-5 illustrate an example door 100 with a door panel 102 at different positions relative to a doorway 104 in a wall 106. Specifically, FIG. 1 shows the door panel 102 in a fully open position in which a leading edge 107 of the door panel 102 is above a top side of the doorway 104 such that the doorway 104 is completely unblocked. FIG. 2 shows the door panel 102 in a partially closed position in which the leading edge 107 is below the top of the doorway 104 (and above a ground) with the doorway 104 being partially blocked. FIG. 3 shows the door panel 102 in a fully closed position in which the doorway 104 is fully blocked with the leading edge 107 of the door panel 102 reaching to the ground. FIG. 4 is a cross-sectional view of the example door of FIGS. 1-3 taken along line 4-4 of FIG. 2. FIG. 5 is a similar view to FIG. 4 except the example door 100 is subject to a surface pressure load 502 (e.g., wind). FIG. 6 is a cross-sectional view of the example door of FIGS. 1-3 taken along line 6-6 of FIG. 2. FIG. 7 is a similar view to FIG. 5 except showing a bag-up event due to the example door 100 being subject to a surface pressure load 702.

In this example, the door panel 102 is a flexible or pliable sheet or curtain that includes lateral edges that move along guides or tracks 108 to open or close the door 100. In this example, the door 10 includes a drive unit 110 with a motor that operates in response to commands from a controller 112 to drive the panel 102 upward and downward between an open position and a closed position. In this example, the motor of the drive unit 110 rotates a roller, drum, or mandrel 114 in a first rotational direction to draw and roll up the door panel 102 toward a fully open position (as illustrated in FIG. 1) or a second rotational direction opposite the first rotational direction to unroll and payout the door panel 102 to a fully closed position (as illustrated in FIG. 3). In some examples, the weight of the door panel 102 hanging from the roller 114 maintains the panel 102 taut. In some examples, the drive unit 110, the roller 114, and/or the rolled up portion of the panel 102 are supported by and/or contained within a header housing 116 (outlined in dashed lines in FIGS. 1-3 for clarity). In some examples, the header housing 116 can be omitted.

In some examples, rather than being wrapped or wound around a roller 114, the lateral edges of the panel 102 can be driven by the drive unit 110 along a storage track positioned above the doorway 104 to store the panel 102 when in the fully open position. In such examples, the storage track above the doorway can follow any suitable path (e.g., straight, curved, bent, inclined, coiled, etc.).

As shown in FIG. 4, the lateral edges of the panel 102 are retained within channels 402 of the tracks 108 during normal operation by one or more retention buttons or protrusions 404 coupled to the door panel 102. More particularly, in some examples, the protrusions 404 are dimensioned to be wider than a gap between retention strips 406 extending along the length of the tracks 108 to inhibit the lateral edge of the panel 102 from being pulled out of the corresponding track 108. In some examples, the protrusions are spaced apart at intervals along the later edges of the door panel 102. In other examples, the protrusions 404 may extend continuously along the length of the lateral edges. In this example, the protrusions 404 are positioned inward of the extreme lateral edge of the door panel 102. However, in other examples, the protrusions 404 may be positioned at the extreme lateral edge of the door panel 102 (e.g., the lateral edge may be a keder edge). In some examples, the door panel 102 may include multiple protrusions at different distances from the extreme lateral edge to provide redundancy and/or for other purposes (e.g., to enable refeed operations and/or to facilitate the driving of the door panel 102 between open and closed positions).

The retention strips 406 of the illustrated example form a gap dimensioned to be wider than a thickness of the panel 102 so that the panel 102 can move between the retention strips 406 with little to no friction and associated wear to the panel 102 and/or to the retention strips 406. In some examples, the panel 102 can move between the retention strips without directly engaging or rubbing against the retention strips 406. Further, as shown in FIG. 4, the protrusions 404 of the illustrated example are positioned on the panel 102 so as to remain slightly spaced apart from the retention strips 406 during normal operation to reduce friction and/or wear. However, as shown in the illustrated example of FIG. 5, when the door panel 102 is subject to a surface pressure load 502 (represented by the arrows identified by reference numeral 502), the door panel 102 can bow across its width in response to a force of the surface pressure load imparting an inwardly directed force 504 that urges the protrusions 404 toward and/or in contact with the retention strips 406. For example, the inwardly directed force 504 is non-parallel (e.g., perpendicular and/or angled) relative to a front surface of the door panel 102. If the surface pressure load 502 and the associated inwardly directed force 504 are strong enough, relatively high amounts of friction between the protrusions 404 and the retention strips 406 can impede or hinder movement of the door panel 102. For instance, in some examples, frictional forces may overcome a torque of the motor thereby causing the motor to stall and, thus, the door panel 102 to stop moving. Additionally or alternatively, while the motor may have enough torque to move the door panel 102, moving the door panel 102 against relatively high frictional forces can cause wear and/or damage to the protrusions 404 and/or the retention strips 406. In some examples, the protrusions 404 and/or the retention strips 406 can be omitted, modified (e.g., with different shapes and/or sizes), and/or their functions implemented using any other suitable mechanism(s). That is, most vertically acting door have lateral edges retained within guide tracks that make the door subject to increased friction forces under a surface pressure load. Teachings disclosed herein are applicable to any such vertical translating door. Further, teachings disclosed herein may also be suitable adapted to horizontally translating doors. Thus, teachings disclosed herein are not limited to the example means for retaining the edge of the door panel 102 (using the protrusions 404 and the retention strips 406) shown in the illustrated example of FIGS. 4 and 5.

In some examples, the controller 112 can analyze feedback from the drive unit 110 to detect or infer a high surface pressure load condition. Additionally, the controller 112 can adjust an operation of the door 100 based on the detected surface pressure load condition. For instance, in some examples, the drive unit 110 can provide a current drawn by a motor when driving the door panel 102 to a different position. In some examples, if the drawn current satisfies (e.g., exceeds) a threshold, the controller 112 can infer that a relatively high friction situation (e.g., a surface pressure load 502) is present. In some examples, a different threshold can be defined for when the door 100 is moving to an open position than when the door 100 is moving to a closed position. Further, in some examples, the threshold can vary as the position of the door panel 102 varies or changes between the fully open and the fully closed positions. Variation in the threshold can be defined to account for the changes in surface area of the door panel 102 on which a surface pressure load 502 can act and/or the length of the door panel 102 that is extended within the tracks 108 to contribute to friction as the panel 102 moves between the open and closed positions. In some examples, the threshold(s) are defined based on historically archived values for the current drawn by the motor during normal operations.

Additionally or alternatively, in some examples, the drive unit 110 can provide feedback output by an encoder that is indicative of the actual speed and/or position of rotation of the roller 114 that the controller 112 can use to detect a surface pressure load condition. More particularly, in some examples, the controller 112 can compare the feedback indicating the actual speed of rotation the roller 114 to the commanded speed of rotation. In some examples, the actual speed can be determined by averaging multiple samples of the door speed captured within a relatively brief window of time. If the actual speed is less than the commanded speed by a threshold, the controller 112 can infer or otherwise determine that the door panel 102 is subject to a surface pressure load 502 that is causing movement of the door panel 102 to slow down. As above, in some examples, the threshold can differ depending on the direction of travel of the door panel 102 and/or the position of the door panel 102 along its full length of travel. In some examples, the threshold can be defined based on historical data collected over some relatively extended period of time (e.g., days, weeks, etc.). In some examples, the threshold can be defined based on a relatively short most recent period of time (e.g., the last 1 second, the last 5 seconds, etc.).

In some examples, the speed of the door panel 102 can be sampled over time to also track an acceleration and/or deceleration of the door. High surface pressure load conditions do not typically occur immediately and, therefore, cannot cause the door panel 102 to slow down or stop immediately. Rather, high surface pressure load conditions are more likely to cause a more gradual slowing of the door panel and/or cause the door speed to vary over time. By contrast, the door panel 102 can slow or stop moving abruptly if the door panel 102 hits an obstruction to its free movement. Accordingly, in some examples, the controller 112 can distinguish between an abrupt deceleration of the door panel 102 (indicative of an obstruction in the path of the door) and a more gradual deceleration of the door panel 102 (indicative of an increasing surface pressure load 502). In some examples, the controller 112 implements digital filtering to reduce false activations caused by mild surface pressure loads (e.g., a mild wind) and/or slight errors in sampling time. Further, in some examples, door speed and/or associated acceleration can be analyzed in conjunction with current draw of the motor, measured wind/air speeds, and/or other sensor feedback to further enhance sensitivity and/or noise immunity.

Additionally or alternatively, in some examples, the controller 112 can infer a high surface pressure load condition based on feedback from a bag-up sensor 118. In some examples, the bag-up sensor 118 is a photoelectric eye sensor that transmits a beam 120 between an optical transmitter and receiver (or an optical transceiver and a retroreflective surface). The bag-up sensor 118 is positioned so that the beam extends either in front of or behind the door panel 102. More particularly, as shown in the illustrated example of FIG. 6, the bag-up sensor 118 is positioned between the wall 106 and the panel 102 in its path of normal operation (i.e., without a surface pressure load and/or the resulting increased friction) such that a beam generated by the bag-up sensor 118 extends between the panel 102 and the wall 106. In this arrangement, the beam produced by the bag-up sensor 118 remains unbroken during normal operation as the door panel 102 moves between the fully open and fully closed positions. However, if a surface pressure load (such as the surface pressure load represented by the arrows indicated by reference numeral 702) is acting on the door panel 102, the door panel 102 can be prevented from moving along the tracks 108 due to increased friction. In such examples, although the panel 102 does not move down the tracks 108 or is impeded by friction from moving as fast as it would in the absence of such friction, the panel 102 can nevertheless continue to unravel from the roller 114 at the originally commanded rate (e.g., speed), thereby resulting in an accumulation or bag-up of the door panel 102 within the header housing 116 (or the associated space at the top of the door if no housing 116 is included). As shown in FIG. 7, the excess portion of the door panel 102 that has accumulated within the header housing 116 can bend and/or cross the beam 120 of the bag-up sensor 118, thereby tripping the sensor to provide feedback to the controller 112 that a bag-up event has occurred. In some examples, the controller 112 can use the detection of a bag-up event to infer that a high surface pressure load condition is present. Based on this inference, the controller 112 can implement a suitable response to the high surface pressure load condition.

In some examples, the door 100 includes and/or is associated with one or more surface pressure load sensors 122 to directly detect the presence of wind or other surface pressure load. In this manner, high surface pressure load conditions can be determined even when the door panel 102 is not moving. The surface pressure load sensors 122 can be any suitable type of sensor capable of determining the air speed associated with a surface pressure load such as an anemometer, a differential pressure sensor, an air flow sensor, etc. In some examples, more than one type of sensor can be implemented. These sensors 122 can communicate feedback data to the controller 112 using any suitable communication methodology and/or protocol (e.g., RS232/485, I2C, serial peripheral interface (SPI), analog input, discrete input, pulse-frequency modulation (PFM), pulse-width modulation (PWM), etc.). As one specific example, the surface pressure load sensor 122 includes a cup anemometer with a magnet mounted on the cup. As the anemometer spins, the magnet activates a hall-effect transistor located in proximity to the cup to provide an input to the controller 112. Such an input produces a PFM signal with a frequency that is proportional to the air speed.

As mentioned above, the controller 112 can automatically adjust the operation of the door 100 in response to the detection of a high surface pressure load event. In some examples, the particular response implemented by the controller can depend on the nature of the high surface pressure load conditions and/or the way in which the surface pressure load is detected. For instance, if the high surface pressure load condition is detected based on the current drawn by the motor and/or based on measurements of the speed and/or associated acceleration/deceleration of the door panel 102, the door panel 102 is necessarily moving. Accordingly, in some examples, the controller 112 causes the door panel 102 to stop moving. In some examples, the controller 112 stops movement of the door panel 102 temporarily (e.g., a for a threshold period of time) before again attempting to move the door panel 102. In some examples, the controller 112 can cause the door panel 102 to move in relative short increments that are temporally spaced (e.g., repeatedly stop and start movement of the door panel 102 in relatively rapid succession) until the door panel 102 reaches a desired position and/or until the surface pressure load is no longer affecting the normal operation of the door 100.

In some examples, in response to detection of a high surface pressure load, the door controller 112 may cause the door panel to reverse directions. In some examples, the reversal can be for only a portion of the distance the door panel 102 has travelled during a current cycle (e.g., moving from a fully closed position to a fully open position and then return to the fully closed position). In other examples, the door panel 102 can be reversed entirely back to a fully closed position or a fully open position. In some examples, the door controller 112 can reduce the speed at which the door panel 102 is to move. In some examples, the speed can be reduced by a fixed amount. In other examples, the amount that the speed is reduced can be determined based on an amount of change in the current draw of the motor and/or the detected deceleration of the door panel 102. The increased friction resulting in high surface pressure load conditions can cause a door 100 to decelerate faster than when no surface pressure load is present such that the door can stop sooner than expected. Accordingly, in some examples, the controller 112 can adjust the position limits (e.g., closed position, open position, partially open position, etc.) set for the door 100 based on the detection of high surface pressure load conditions to ensure that the door panel 102 reaches the desired position rather than stopping short of the desired position.

In some examples, some combination and/or series of operations of stopping (or delaying) movement of the door, changing the door speed, changing the direction of the door, and/or changing door position limits can be implemented by the controller 112. For instance, the door controller 112 can cause the door panel 102 to reverse direction for a short distance (potentially at a different speed), stop the panel for a brief period, and then reverse the direction to again move in the direction the panel 102 was initially moving when the high surface pressure load condition was detected. In some such examples, the door panel 102 can be controlled to move at a slower speed and/or move in intermittent spurts along relative short distances to give an opportunity for the door panel 102 to advance during intermittent lulls in the wind.

In examples where high surface pressure load conditions are detected based on the tripping of the bag-up sensor 118, the door controller 112 can first cause the door panel 102 to move to the fully open position. For example, if the controller 112 initially causes the door panel 102 to move toward the fully closed position, the controller 112 causes the door panel 102 to reverse direction and move to the fully open position. Moving to the fully open position enables any excess length of the panel 102 that has accumulated in the header housing 116 to be rewound around the roller 114. Thereafter, the door controller 112 can re-initiate a closing operation at a lower speed in an attempt to avoid the surface pressure load from causing another bag-up event. If a bag-up event still occurs, the controller 112 can again reverse the direction of the door 100 until the door panel 102 is fully opened again. In some examples, the controller 112 can repeat the closing sequence another time at an even lower speed compared to a speed of a prior closing sequence. In some examples, rather than reversing the direction of the door panel 102 until it moves to the fully opened position, the controller 112 controls the panel 102 to reverse part way back without returning all the way to the fully open position. More particularly, in some examples, the controller 112 reverses the direction of the panel 102 until the door panel 102 is no longer obstructing the bag-up sensor 118 before again attempting to move the door panel 102 to the closed position. In some examples, the door panel 102 can be reversed a threshold distance or a threshold amount of time after being cleared from the path of the beam 120 of the bag-up sensor 118 before again attempting to move the door panel 102 to the closed position.

Any of the above operations and/or operation adjustment can also be implemented by the controller 112 in response to feedback from the surface pressure load sensors 122 indicating a high surface pressure load condition. Furthermore, inasmuch as the surface pressure load sensors 122 can detect surface pressure load conditions without the door panel 102 moving (e.g., toward the fully closed position), the controller 112 can additionally or alternatively implement other operations based on feedback from such sensors. For instance, in some examples, the controller 112 can generate an alert and/or notification to personnel located on the opposite side of the door 100 of a detected high surface pressure load condition. In some examples, the particular speed at which the door panel 102 is to move can be adjusted based on changes in the detected air speed associated with the surface pressure load. In some examples, the controller 112 can prevent the door panel 102 from moving (e.g., prevent from opening and/or delay the closing of the panel) when a high surface pressure load condition is detected. In some examples, the controller 112 can automatically activate or energize one or more wind locks 124 (FIGS. 1-3) positioned along the tracks 108 in response to air speeds satisfying (e.g., exceeding) a threshold to mechanically secure the lateral edges of the door panel 102 within the tracks 108. Likewise, in some such examples, the controller 112 can automatically deactivate or deenergize the wind locks 124 when the air speed drops below the threshold (or a different threshold). As used herein, wind locks are mechanical devices that clamp, grip, or otherwise attach to the lateral edges of the panel 102 when in the closed position to hold the lateral edges of the panel 102 in place so as not to be blown out of the tracks 108 by high surface pressure load conditions.

Figure 8:
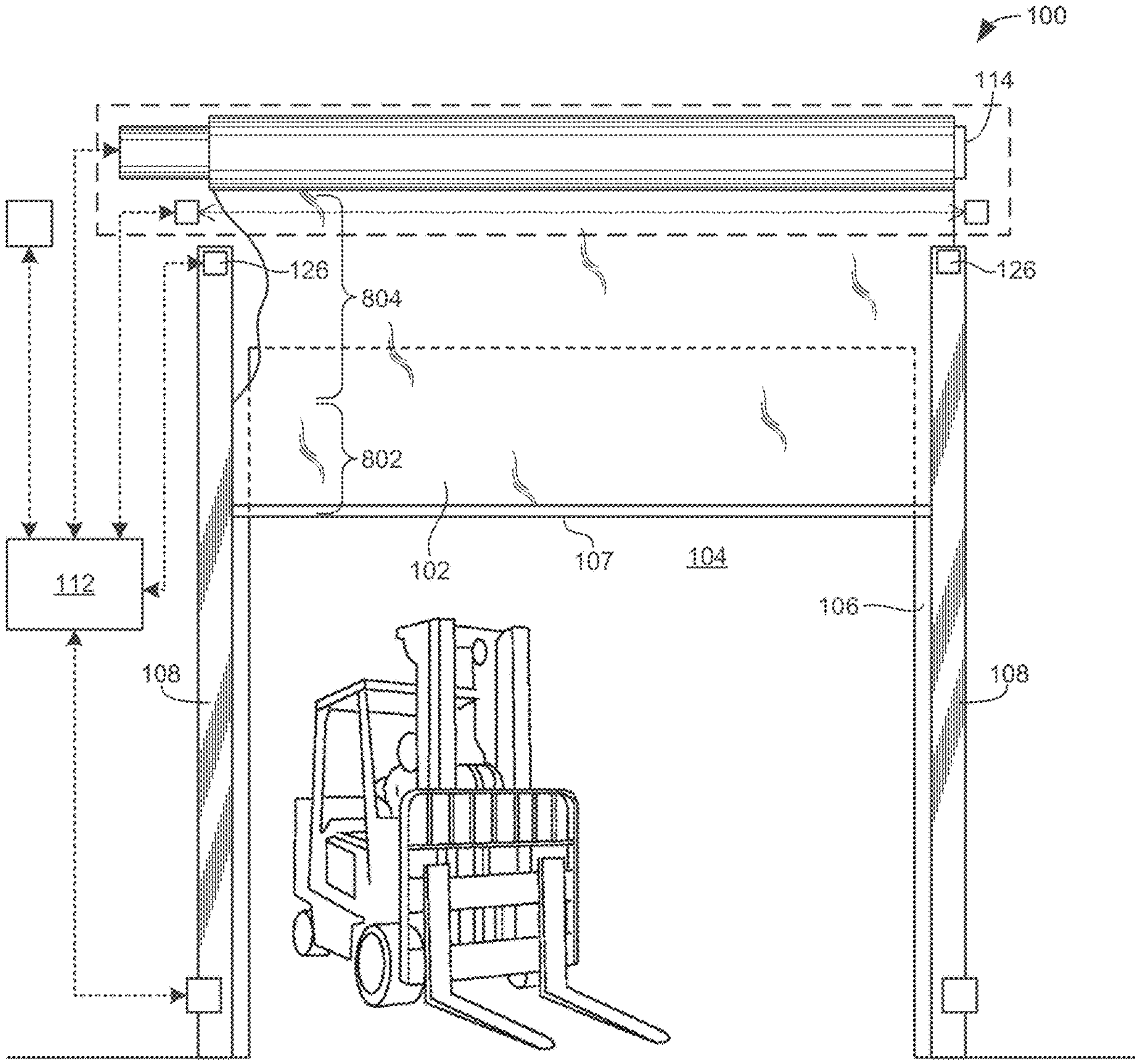
FIG. 8 illustrates the example door of FIG. 1 with a portion of the example panel partially misfed and outside of the track.

As discussed above in connection with FIG. 5, a surface pressure load 502 on the door panel 102 can produce the inwardly directed force 504 that urges the protrusions 404 toward a center of the door panel 102. The retention strips 406 along the tracks 108 serve to retain the protrusions 404 with the tracks 108 so that the door panel 102 can be properly guided between open and closed positioned. However, in some instances, there can be an appreciable distance (e.g., several inches) between the bottom of the roller 114 and the upper end of the tracks 108 that is spanned by the door panel 102 without any structure (e.g., tracks 108 and/or associated retention strips 406) to support the lateral edges of the door panel 102 or retain the protrusions 404. As a result, the inwardly directed force 504 from the surface pressure load 502 discussed in FIG. 5 urge the protrusions 404 laterally inward in the gap between the roller 114 and the upper end of the tracks 108 an extent sufficient to prevent the protrusions 404 from properly being fed into the tracks 108 as the door panel 102 is moved towards the closed position. In some examples, the misfed portion of the door panel 102 can correspond to less than all of the lateral edge of the door panel 102. For instance, FIG. 8 illustrates the example door 100 of FIG. 1 following a misfeed event. As shown in the illustrated example, while a bottom or leading portion 802 of the door panel 102 was properly fed into both tracks 108, a later or upper portion 804 of the panel 102 on the left side was not properly fed into the left side track 108. Thus, as shown in the illustrated example, the lateral edge of the panel 102 is outside of the track 108 rather than being retained therein. In other situations, the bottom portion 802 of the door panel 102 may be misfed and end up outside of the track in addition to or instead of the upper portion 804 of the door panel 102. Further, while the example misfeed event represented in FIG. 8 only impacts the left side of the panel 102, in other situations, a misfeed event may occur on the right side of the panel 102 or on both sides of the panel.

Misfeed events, such as that shown in FIG. 8, can occur due to the inwardly directed force 504 acting on the panel 102 in the region between the roller 114 and the upper end of the tracks 108 as described above. Further, misfeed events can results from bag-up events such as that shown and described in connection with FIG. 7. That is, while there may not be a sufficient inwardly directed force to cause the protrusions 404 to miss entry into the tracks 108, as the panel 102 bags up and folds over on itself, as shown in FIG. 7, the panel 102 may fold in a manner that results in the protrusions 404 and an associated portion of the lateral edge of the door panel 102 ending up outside of the tracks 108. Regardless of the cause of the misfeed event, in some examples, the controller 112 is in communication with misfeed sensors 126 to monitor and detect such events. The misfeed sensors 126 can be any suitable type of sensor capable of detecting the presence of a lateral edge of the panel 102 within an associated track 108. For example, the misfeed sensors 126 can be magnetic proximity sensors, photo electric sensors, physical switches, radar sensors, sonar sensors, lidar sensors, resistive or capacitive pressure sensors, etc. In some examples, as shown in FIGS. 1-3, and 8, the misfeed sensors 126 are positioned near the upper ends of the tracks 108 to detect the presence of the door panel 102 within the track 108 at that location. If the controller 112 receives a signal from the misfeed sensors 126 indicating the door panel cannot be detected (e.g., is missing within the tracks 108) when the panel 102 is expected to be within the tracks 108, the controller 112 determines that a misfeed event has occurred.

The controller 112 can determine whether the panel 102 is expected to be within the tracks 108 by monitoring a position of the leading edge 107 of the panel 102 and whether the leading edge 107 is below the point where the misfeed sensors 126 are located. In some examples, the position of the door panel 102 (e.g., the position of the leading edge 107 of the panel 102) is monitored based on feedback from an encoder. Thus, in the illustrated example of FIG. 8, the door panel 102 is expected to be within the track at the point of the misfeed sensors 126 because the leading edge 107 is below the misfeed sensors 126. However, in this example, the upper portion 804 of the panel 102 is outside of the track because of the misfeed. As a result, the misfeed sensor 126 will not detect the panel 102 within the track 108 (e.g., the misfeed sensor 126 will detect that the panel 102 is missing). Based on this information, the controller 112 can infer that a misfeed event has occurred.

In some examples, in response to detecting a misfeed event based on feedback from one or both of the misfeed sensors 126, the controller 112 automatically attempts to refeed the panel 102 into the tracks 108 by moving the panel 102 to the open position and then again moving the panel 102 to the closed position. In some instances, the refeed attempts are performed at different speeds (e.g., faster, slower, and/or at variable speeds) than the previous door cycle that resulted in the misfeed event. In some examples, during a refeed event, the controller 112 monitors feedback from the misfeed sensors 126 to limit the extent to which the door panel 102 is moved towards the open position before again closing the door panel 102. For instance, in the illustrated example of FIG. 8, as the door panel 102 is raised, the misfeed sensor 126 will eventually detect the bottom portion 802 of the panel 102 that is already properly positioned within the tracks 108. As a result, in some examples, when the door panel 102 reaches this point, there is no need to open the door further such that the controller 112 will cause the panel 102 to move to toward the closed position to attempt to refeed the upper portion 804 of the panel 102 that was previously misfed. Further detail regarding the detection and automatic correction of misfeed events are provided below in connection with FIGS. 15-19.

Figure 9:
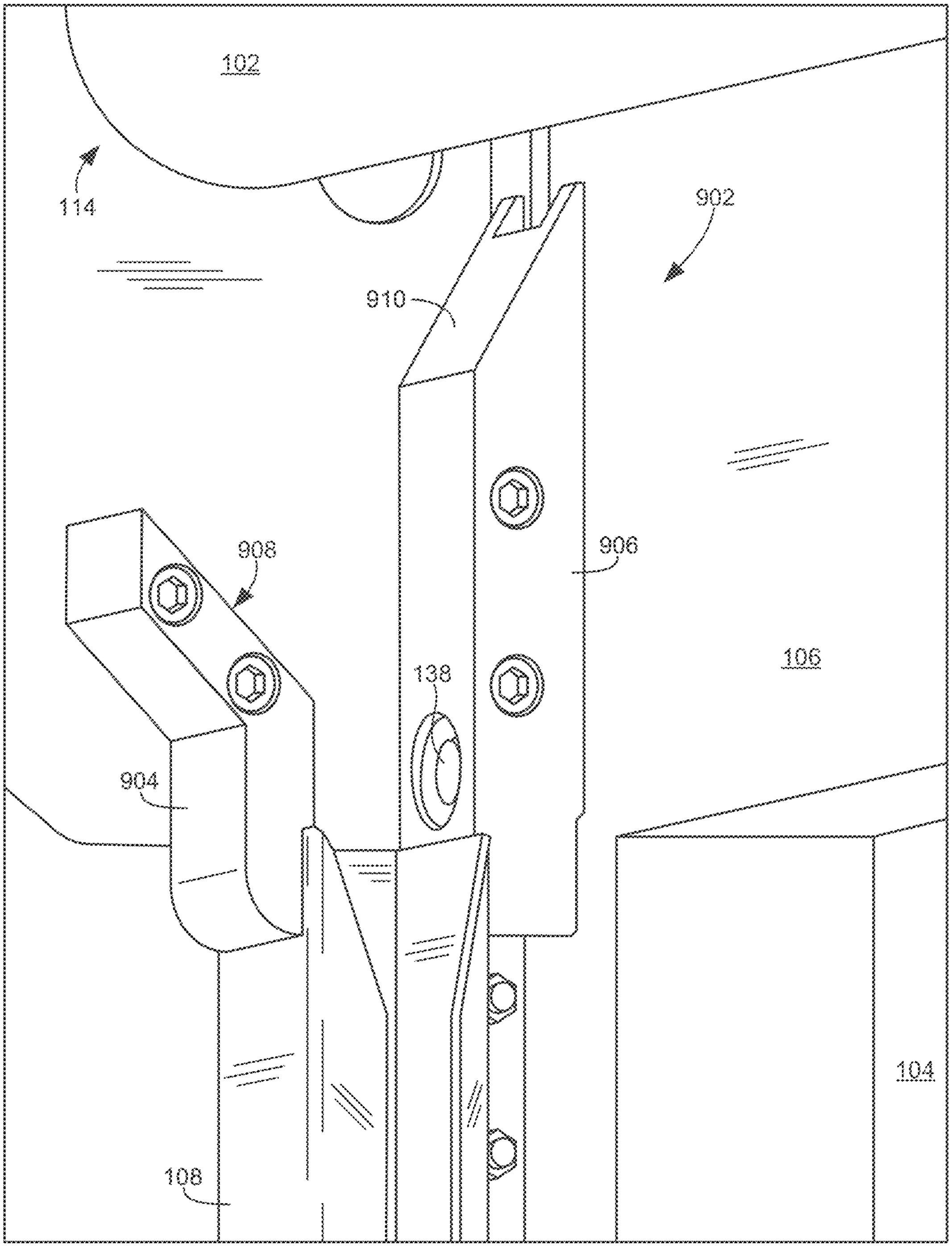
FIG. 9 illustrate an example refeed assembly that may be implemented with the example door of FIG. 1.

In some examples, the door 100 includes a refeed assembly that can facilitate the feeding and/or refeeding of the panel 102 into the tracks. FIG. 9 illustrates an example refeed assembly 902 that can be implemented in connection with the door 100 of FIG. 1. In this example, the refeed assembly includes two refeed blocks 904, 906 positioned on either side (e.g., front and back) of the track 108 so as to extend upward from of the upper end of the track 108 through which the panel 102 is to extend. Thus, the refeed blocks 904, 906 serve as an extension of the tracks 108. As shown in the illustrated example, the refeed blocks 904, 906 include respective upper surfaces 908, 910 that are angled away from one another to provide an expanded opening that can help capture the free end (leading edge 107) of the door panel 102 and direct the panel 102 into the track 108. As shown in the illustrated example, the misfeed sensor 126 is positioned within the refeed blocks 904, 906 above the track 108 (rather than being positioned within the track 108 as shown in FIGS. 1-3 and 8).

Figure 10:
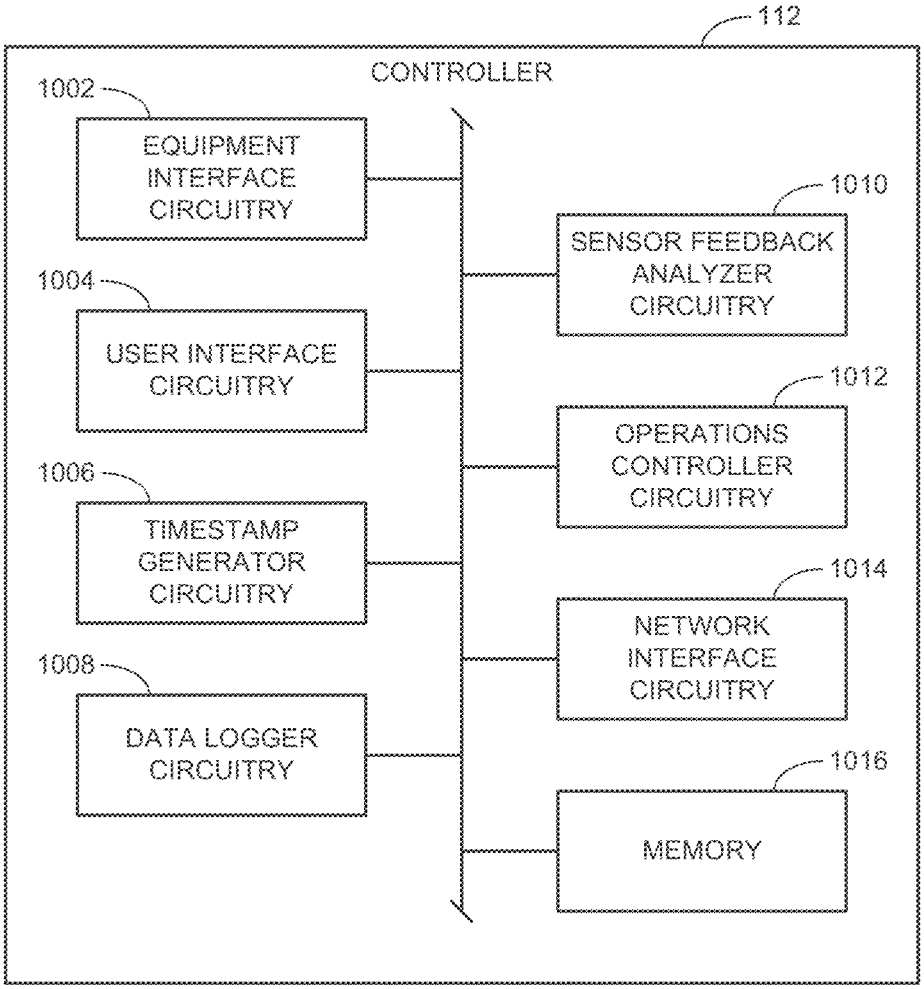
FIG. 10 illustrates an example implementation of the example controller of FIGS. 1-3 and/or 8.

FIG. 10 illustrates an example implementation of the example controller 112 of FIG. 1. The controller 112 of FIG. 10 may be instantiated (e.g., creating an instance of, bring into being for any length of time, materialize, implement, etc.) by processor circuitry such as a central processing unit executing instructions. Additionally or alternatively, the controller 112 of FIG. 10 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 10 may, thus, be instantiated at the same or different times. Some or all of the circuitry may be instantiated, for example, in one or more threads executing concurrently on hardware and/or in series on hardware. Moreover, in some examples, some or all of the circuitry of FIG. 10 may be implemented by one or more virtual machines and/or containers executing on the microprocessor. As shown in FIG. 10, the example controller 112 includes example equipment interface circuitry 1002, example user interface circuitry 1004, example timestamp generator circuitry 1006, example data logger circuitry 1008, example sensor feedback analyzer circuitry 1010, example operations controller circuitry 1012, example network interface circuitry 1014, and example memory 1016.

The example equipment interface circuitry 1002 enables communications between the controller 112 and equipment associated with the door 100. That is, in some examples, the controller 112 can provide instructions and/or commands via the equipment interface circuitry 1002 to different equipment associated with the door 100 such as the motorized drive unit 110 and/or the wind locks 124. Further, the controller 112 can receive feedback from drive unit 110 and/or other sensors (e.g., the bag-up sensor 118, the surface pressure load sensors 122, and/or the misfeed sensors 126) associated with the equipment via the equipment interface circuitry 1002. In some examples, the equipment interface circuitry 1002 is associated with a user interface by which a user can provide inputs to the controller 112 to direct its operation (e.g., via buttons and/or a display). In some examples, the equipment interface circuitry 1002 is instantiated by processor circuitry executing equipment interface instructions and/or configured to perform operations such as those represented by the flowcharts of FIGS. 11-19.

The example user interface circuitry 1004 enables a user to configure settings, manually adjust operations, provide inputs, and/or otherwise interact with the controller 112. In some examples the user interface circuitry 1004 is associated with a display screen to enable the display of information relating to the operation and/or state of the door 100 and/or any of its associated components. In some examples, the user interface circuitry 1004 is instantiated by processor circuitry executing user interface instructions and/or configured to perform operations such as those represented by the flowcharts of FIGS. 11-19.

The example timestamp generator circuitry 1006 timestamps sensor feedback data obtained via the equipment interface circuitry 1002 and stores such data in the example memory 1016. The example data logger circuitry 1008 logs the sensor feedback data in the memory 1016 with the associated timestamp provided by the example timestamp generator circuitry 1006. Additionally or alternatively, the example data logger circuitry 1008 can provide the timestamped sensor feedback data to a remote server for storage and/or subsequent analysis. In some examples, the timestamp generator circuitry 1006 is instantiated by processor circuitry executing timestamp generator instructions and/or configured to perform operations such as those represented by the flowcharts of FIGS. 11-19.

The example sensor feedback analyzer circuitry 1010 analyzes feedback data from sensors associated with the door 100 to enable the controller 112 to determine the status and/or condition of the associated equipment and/or the conditions of the environment and use of the area surrounding the door 100. More particularly, in some examples the sensor feedback analyzer circuitry 1010 can determine or infer the presence of a high surface pressure load condition. Additionally or alternatively, in some examples the sensor feedback analyzer circuitry 1010 determines whether a misfeed event has occurred. In some examples, the results of the analysis of the sensor feedback data can be stored in the memory 1016 along with the sensor feedback data and/or transmitted to a remote server for storage and/or subsequent analysis. In some examples, the sensor feedback analyzer circuitry 1010 can analyze such historical data to identify trends, patterns, and/or changes in conditions that appear across time. In some examples, the sensor feedback analyzer circuitry 1010 is instantiated by processor circuitry executing sensor feedback analyzer instructions and/or configured to perform operations such as those represented by the flowcharts of FIGS. 11-19.

The example operations controller circuitry 1012 controls the operations of the equipment associated with the door 100. That is, in some examples, the operations controller circuitry 1012 generates instructions and/or commands for the equipment based on the output of the sensor feedback analyzer circuitry 1010. For instance, in some examples, the operations controller circuitry 1012 can determine to stop the movement of the door panel 102, move the door panel 102 in short temporally spaced increments, reverse the direction of the door panel 102, change the speed of the door panel 102, and/or adjust the position limits set for the door panel 102 based on the sensor feedback data indicating a high surface pressure load condition and/or a misfeed event. In some examples, the operations controller circuitry 1012 generates alerts and/or notifications to be provided to a user via the user interface circuitry 1004 and/or transmitted to a remote server and/or to other remote computing devices (e.g., mobile devices) of relevant individuals. In some examples, such alerts and/or notifications are transmitted directly to the remote computing devices via the example network interface circuitry 1014. For instance, the network interface circuitry 1014 can send out email messages and/or SMS messages to one or more designated computing devices. In some examples, the alerts and/or notifications can be transmitted to a remote server and the remote server then distributes the messages to other remote computing devices. In some examples, the operations controller circuitry 1012 can activate a separate output device (e.g., a light, a bell, a horn, etc.) to indicate the alert and/or notification. In some examples, the operations controller circuitry 1012 is instantiated by processor circuitry executing operations controller instructions and/or configured to perform operations such as those represented by the flowcharts of FIGS. 11-19. In some examples, the network interface circuitry 1014 is instantiated by processor circuitry executing network interface instructions and/or configured to perform operations such as those represented by the flowcharts of FIGS. 11-19.

While an example manner of implementing the controller 112 of FIG. 1 is illustrated in FIG. 10, one or more of the elements, processes and/or devices illustrated in FIG. 10 can be combined, divided, re-arranged, omitted, eliminated and/or implemented in any other way. Further, the example equipment interface circuitry 1002, the example user interface circuitry 1004, the example timestamp generator circuitry 1006, the example data logger circuitry 1008, the example sensor feedback analyzer circuitry 1010, the example operations controller circuitry 1012, the example network interface circuitry 1014, the example memory 1016 and/or, more generally, the example controller 112 of FIG. 1 can be implemented by hardware alone or by hardware in combination with software and/or firmware. Thus, for example, any of the example equipment interface circuitry 1002, the example user interface circuitry 1004, the example timestamp generator circuitry 1006, the example data logger circuitry 1008, the example sensor feedback analyzer circuitry 1010, the example operations controller circuitry 1012, the example network interface circuitry 1014, the example memory 1016 and/or, more generally, the example controller 112 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)) such as Field Programmable Gate Arrays (FPGAs). Further still, the example controller 112 of FIG. 1 can include one or more elements, processes and/or devices in addition to, or instead of, those illustrated in FIG. 10, and/or can include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some examples, the controller 112 includes means for analyzing sensor feedback data. For example, the means for analyzing sensor feedback data may be implemented by sensor feedback analyzer circuitry 1010. In some examples, the sensor feedback analyzer circuitry 1010 may be instantiated by processor circuitry such as the example processor circuitry 2012 of FIG. 20. For instance, the sensor feedback analyzer circuitry 1010 may be instantiated by the example microprocessor 2100 of FIG. 21 executing machine executable instructions such as those implemented by at least blocks 1104, 1106, 1108, 1110, 1112, 1122 of FIG. 11, blocks 1204, 1206, 1208, 1216, of FIG. 12, blocks 1304, 1318 of FIG. 13, blocks 1404, 1406 of FIG. 14, blocks 1502, 1504, 1512 of FIG. 15, block 1604 of FIG. 16, and block 1706 of FIG. 17. In some examples, the sensor feedback analyzer circuitry 1010 may be instantiated by hardware logic circuitry, which may be implemented by an ASIC, XPU, or the FPGA circuitry 2200 of FIG. 22 structured to perform operations corresponding to the machine readable instructions. Additionally or alternatively, the sensor feedback analyzer circuitry 1010 may be instantiated by any other combination of hardware, software, and/or firmware. For example, the sensor feedback analyzer circuitry 1010 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the controller 112 includes means for controlling operations of a door. For example, the means for controlling operations of a door may be implemented by operations controller circuitry 1012. In some examples, the operations controller circuitry 101 2may be instantiated by processor circuitry such as the example processor circuitry 2012 of FIG. 20. For instance, the operations controller circuitry 1012 may be instantiated by the example microprocessor 2100 of FIG. 21 executing machine executable instructions such as those implemented by at least blocks 1102, 1114, 1116, 1118, 1120, 1124, 1126 of FIG. 11, blocks 1202, 1210, 1212, 1214, 1218, 1226 of FIG. 12, blocks 1302, 1306, 1308, 1310, 1312, 1314, 1316, 1320, 1322, 1324 of FIG. 13, blocks 1402, 1408, 1410, 1412, 1414, 1416, 1418, 1420, 1422, 1424, 1426 of FIG. 14, blocks 1506, 1508, 1510, 1514, 1516, 1518 of FIG. 15, blocks 1602, 1604 of FIG. 16, blocks 1702, 1708 of FIG. 17, blocks 1802, 1806 of FIG. 18, blocks 1902, 1904, 1906 of FIG. 19. In some examples, the operations controller circuitry 1012 may be instantiated by hardware logic circuitry, which may be implemented by an ASIC, XPU, or the FPGA circuitry 2200 of FIG. 22 structured to perform operations corresponding to the machine readable instructions. Additionally or alternatively, the operations controller circuitry 1012 may be instantiated by any other combination of hardware, software, and/or firmware. For example, the operations controller circuitry 1012 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the controller 112 includes means for transmitting data over a network. For example, the means for transmitting data over a network may be implemented by network interface circuitry 1014. In some examples, the network interface circuitry 1014 may be instantiated by processor circuitry such as the example processor circuitry 2012 of FIG. 20. For instance, the network interface circuitry 1014 may be instantiated by the example microprocessor 2100 of FIG. 21 executing machine executable instructions such as those implemented by at least block 1120 of FIG. 11, block 1214 of FIG. 12, block 1312 of FIG. 13, block 1410 of FIG. 14, block 1518 of FIG. 15. In some examples, the network interface circuitry 1014 may be instantiated by hardware logic circuitry, which may be implemented by an ASIC, XPU, or the FPGA circuitry 2200 of FIG. 22 structured to perform operations corresponding to the machine readable instructions. Additionally or alternatively, the network interface circuitry 1014 may be instantiated by any other combination of hardware, software, and/or firmware. For example, the network interface circuitry 1014 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Flowcharts representative of example hardware logic circuitry, machine readable instructions, hardware implemented state machines, and/or any combination thereof for implementing the controller 112 of FIGS. 1 and/or 10 is shown in FIGS. 11-19. The machine readable instructions can be one or more executable programs or portion(s) of an executable program for execution by processor circuitry, such as the processor circuitry 2012 shown in the example processor platform 2000 discussed below in connection with FIG. 20 and/or the example processor circuitry discussed below in connection with FIGS. 21 and/or 22. The program can be embodied in software stored on one or more non-transitory computer readable storage media such as a compact disk (CD), a floppy disk, a hard disk drive (HDD), a solid-state drive (SDD), a digital versatile disk (DVD), a Blu-ray disk, or a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with the processor circuitry, but the entire program and/or parts thereof could alternatively be executed by one or more hardware devices other than the processor circuitry 2012 and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example programs described with reference to the flowcharts illustrated in FIGS. 11-19, many other methods of implementing the example controller 112 can alternatively be used. For example, the order of execution of the blocks can be changed, and/or some of the blocks described can be changed, eliminated, or combined. Additionally or alternatively, any or all of the blocks can be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry can be distributed in different network locations and/or local to one or more hardware devices (e.g., a single-core processor (e.g., a single core central processor unit (CPU)), a multi-core processor in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein can be stored in one or more of a compressed format, an encrypted format, a fragmented format, a compiled format, an executable format, a packaged format, etc. Machine readable instructions as described herein can be stored as data or a data structure (e.g., as portions of instructions, code, representations of code, etc.) that can be utilized to create, manufacture, and/or produce machine executable instructions. For example, the machine readable instructions can be fragmented and stored on one or more storage devices and/or computing devices (e.g., servers) located at the same or different locations of a network or collection of networks (e.g., in the cloud, in edge devices, etc.). The machine readable instructions can require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions can be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions can be stored in a state in which they can be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, can include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions can be represented using any of the following languages: C, C++, Java, C#, Perl, Python, JavaScript, HyperText Markup Language (HTML), Structured Query Language (SQL), Swift, etc.

As mentioned above, the example processes of FIGS. 11-19 can be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 11:
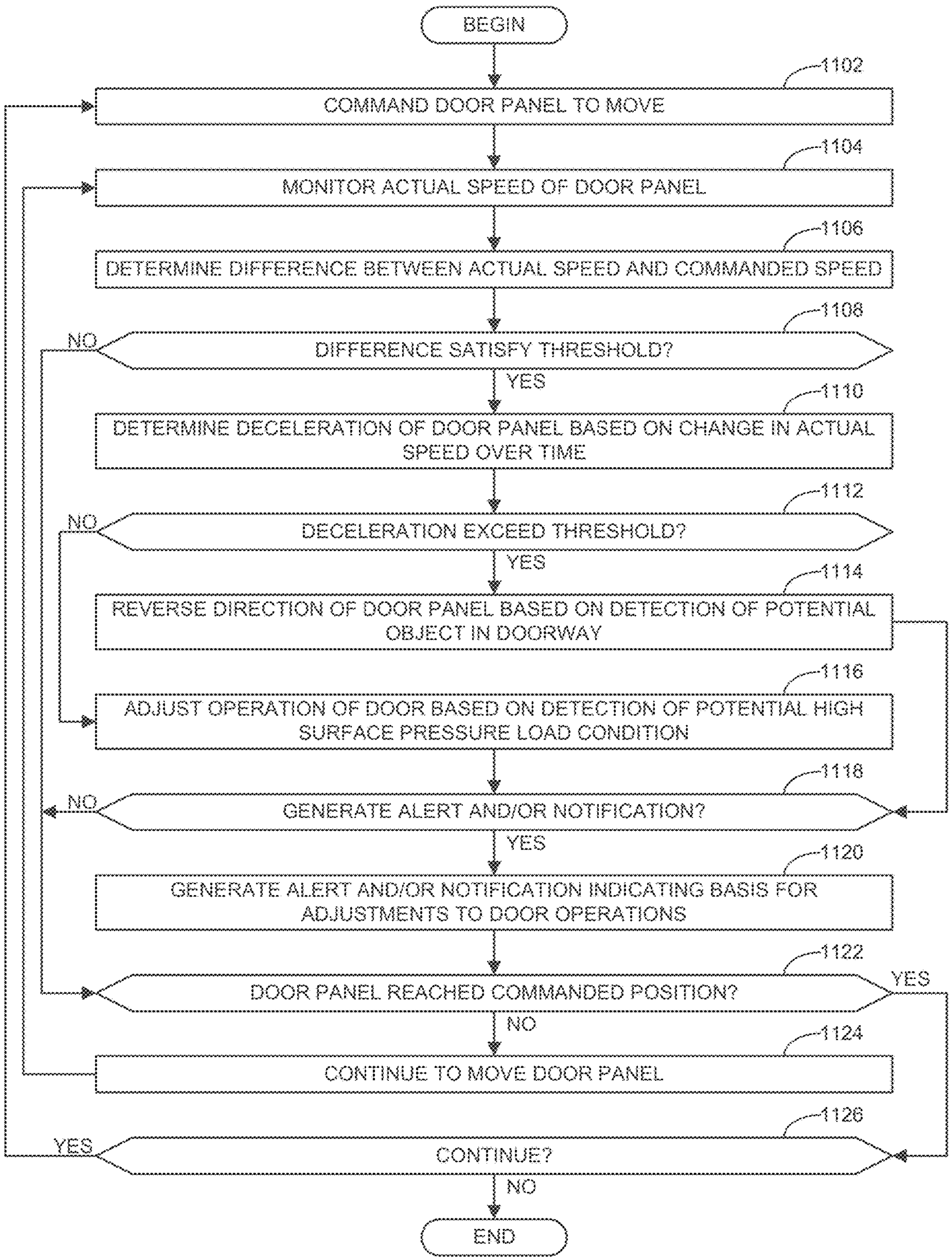
FIGS. 11-19 are flowcharts representative of example machine readable instructions and/or example operations to implement the example controller of FIGS. 1-3, 8, and/or 10.

The example machine readable instructions and/or example operations of FIG. 11 begin at block 1102 where the example operations controller circuitry 1012 commands the door panel 102 to move. That is, the example operations controller circuitry 1012 sends a command to the drive unit 110 to rotate the roller 114 to cause the door panel 102 to move to a particular position (e.g., a fully open position, a fully closed position, or some intermediate position between the fully open position and the fully closed position). At block 1104, the example sensor feedback analyzer circuitry 1010 monitors the actual speed of the door panel 102. The actual speed of the door panel 102 can be monitored based on feedback from an encoder that tracks the position and/or speed of rotation of the motor and/or roller 114. At block 1106, the example sensor feedback analyzer circuitry 1010 determines a difference between the actual speed and a commanded speed (e.g., as defined by the operations controller circuitry 1012). At block 1108, the example sensor feedback analyzer circuitry 1010 determines whether the difference satisfies (e.g., exceeds) a threshold. If so, control advances to block 1110 where the example sensor feedback analyzer circuitry 1010 determines a deceleration of the door panel 102 based on the change in actual speed over time. At block 1112, the example sensor feedback analyzer circuitry 1010 determines whether the deceleration exceeds a threshold. A deceleration that exceeds the threshold indicates a relatively abrupt stop or reduction in the door speed indicative of the door panel 102 hitting an object. Accordingly, if the deceleration exceeds the threshold, control advances to block 1114, where the example operations controller circuitry 1012 reverses the direction of the door panel 102 based on the detection of a potential object in the doorway 104. Thereafter, control advances to block 1118.

Returning to block 1112, a deceleration that does not exceed the threshold is indicative of a gradual slowing of the door panel 102, which can be inferred as a high surface pressure load condition. Accordingly, in such situations, control advances to block 1116 where the example operations controller circuitry 1012 adjusts operation of the door 100 based on detection of a potential high surface pressure load condition. The particular way in which the operations of the door 100 are adjusted can depend on the circumstances of the door 100 (e.g., the current position and/or direction of movement of the door panel 102 at the time the high surface pressure load condition is detected). In some examples, the door panel 102 can be stopped momentarily. In some examples, the door panel 102 is alternately stopped for brief periods and moved for brief periods to incrementally move the door panel 102 towards the commanded position (e.g., fully open position, fully closed position, etc.). In some examples, the speed of the door panel 102 can be changed (e.g., reduced). In some examples, the direction of the door panel 102 can be reversed. In some examples, the position limits set for the door panel can be adjusted. After adjustment of the operation of the door (block 1116), control advances to block 1118.

At block 1118, the example operations controller circuitry 1012 determines whether to generate an alert and/or notification. If so, control advances to block 1120 where the example operations controller circuitry 1012 generates an alert and/or notification indicating the basis for the adjustments to the door operations (either the door reversal at block 1114 or the other adjustments at block 1116). In some examples, the network interface circuitry 1014 can transmit the alert and/or notification to a remote server and/or other remote devices associated with relevant personnel. Thereafter, control advances to block 1122. If no alert and/or notification is to be generated at block 1118, control advances directly to block 1122. Returning to block 1108, if the difference between the actual speed and commanded speed does not satisfy the threshold, control advances directly to block 1122.

At block 1122, the example sensor feedback analyzer circuitry 1010 determines whether the door panel 102 has reached the commanded position. The commanded position can correspond to the original position as defined by the example operations controller circuitry 1012 when the door panel 102 was first commanded to move (at block 1104) or when subsequently adjusted (at block 1114 or 1116). If the door panel 102 has not reached its commanded position, control advances to block 1124 where the example operations controller circuitry 1012 continues to move the door panel 102. Thereafter, control returns to block 1104. If the door panel 102 has reached its commanded position, control advances to block 1126 where the operations controller circuitry 1012 determines whether to continue. If so, control returns to block 1102. Otherwise, the example process of FIG. 11 ends.

Figure 12:
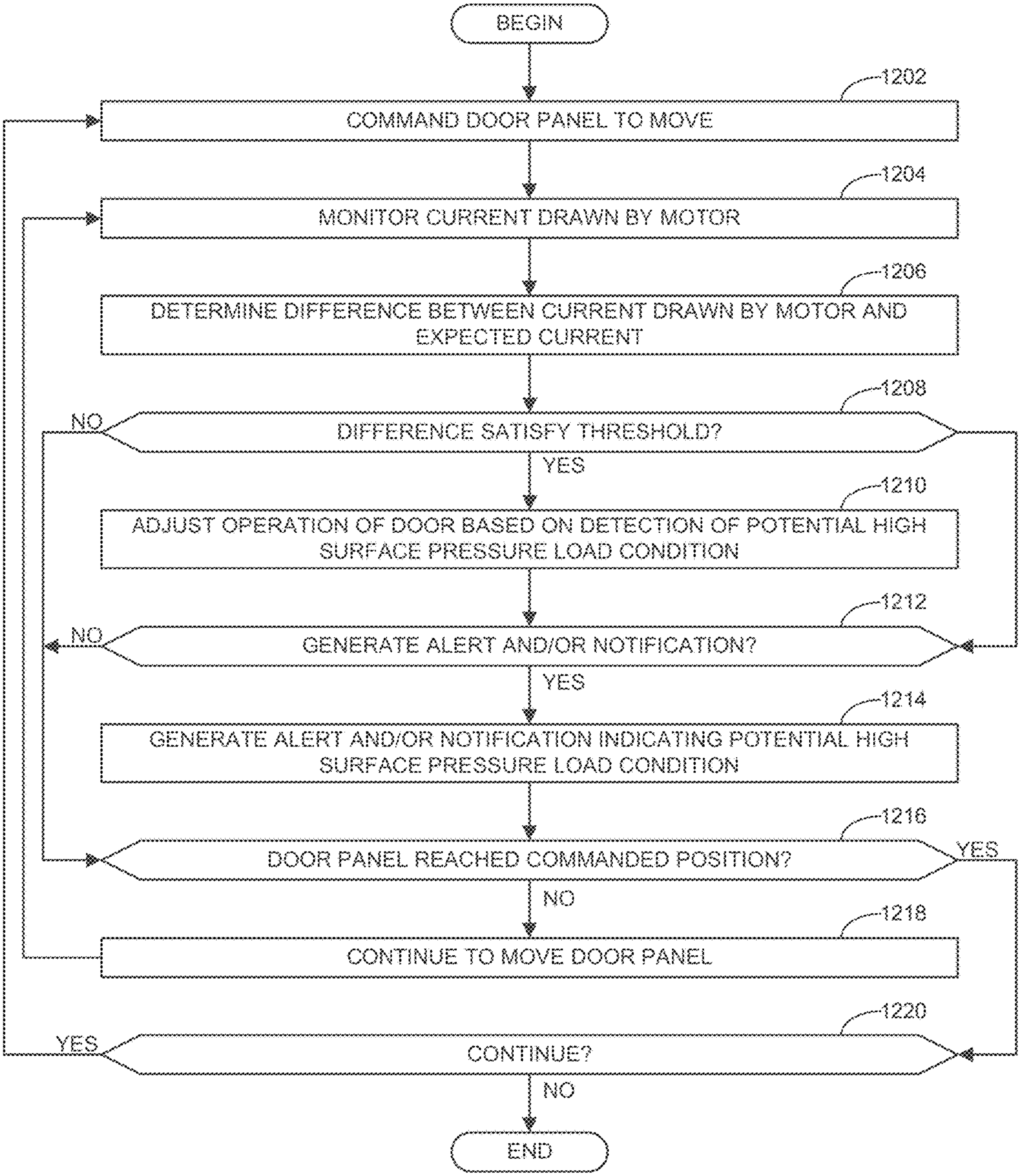

The example machine readable instructions and/or example operations of FIG. 12 begin at block 1202 where the example operations controller circuitry 1012 commands the door panel 102 to move. That is, the example operations controller circuitry 1012 sends a command to the drive unit 110 to rotate the roller 114 to cause the door panel 102 to move to a particular position (e.g., a fully open position, a fully closed position, or an intermediate position between the fully open position and the fully closed position). At block 1204, the example sensor feedback analyzer circuitry 1010 monitors the current drawn by the motor of the drive unit 110. At block 1206, the example sensor feedback analyzer circuitry 1010 determines a difference between the current drawn by the motor and an expected current. In some examples, the expected current is defined based on historically archived data of the door operating in normal conditions. In some examples, the expected current is defined based on an average current over a most recent period of time. That is, in some examples, the difference determined at block 1206 is an indication of a deviation to the ongoing amount of current drawn by the motor.

At block 1208, the example sensor feedback analyzer circuitry 1010 determines whether the difference satisfies (e.g., exceeds) a threshold. If so, control advances to block 1210 where the example operations controller circuitry 1012 adjusts operation of the door 100 based on detection of a potential high surface pressure load condition. The particular way in which the operations of the door 100 are adjusted can depend on the circumstances of the door (e.g., the current position and/or direction of movement of the door panel 102 at the time the high surface pressure load condition is detected). In some examples, the door panel 102 can be stopped momentarily. In some examples, the door panel 102 is alternately stopped for brief periods and moved for brief periods to incrementally move the panel towards the commanded position. In some examples, the speed of the door panel 102 can be changed (e.g., reduced). In some examples, the direction of the door panel 102 can be reversed. In some examples, the position limits set for the door panel can be adjusted. After adjustment of the operation of the door (block 1210), control advances to block 1212.

At block 1212, the example operations controller circuitry 1012 determines whether to generate an alert and/or notification. If so, control advances to block 1214 where the example operations controller circuitry 1012 generates an alert and/or notification indicating the potential high surface pressure load condition. In some examples, the network interface circuitry 1014 can transmit the alert and/or notification to a remote server and/or other remote devices associated with relevant personnel. Thereafter, control advances to block 1216. If no alert and/or notification is to be generated at block 1212, control advances directly to block 1216. Further, returning to block 1208, if the difference between the current drawn by the motor and the expected current does not satisfy the threshold, control advances directly to block 1216.

At block 1216, the example sensor feedback analyzer circuitry 1010 determines whether the door panel 102 has reached the commanded position. The commanded position can correspond to the original position as defined by the example operations controller circuitry 1012 when the door panel 102 was first commanded to move (at block 1204) or when subsequently adjusted (at block 1210). If the door panel 102 has not reached its commanded position, control advances to block 1218 where the example operations controller circuitry 1012 continues to move the door panel 102. Thereafter, control returns to block 1204. If the door panel 102 has reached a commanded position, control advances to block 1226 where the operations controller circuitry 1012 determines whether to continue. If so, control returns to block 1202. Otherwise, the example process of FIG. 12 ends.

Figure 13:
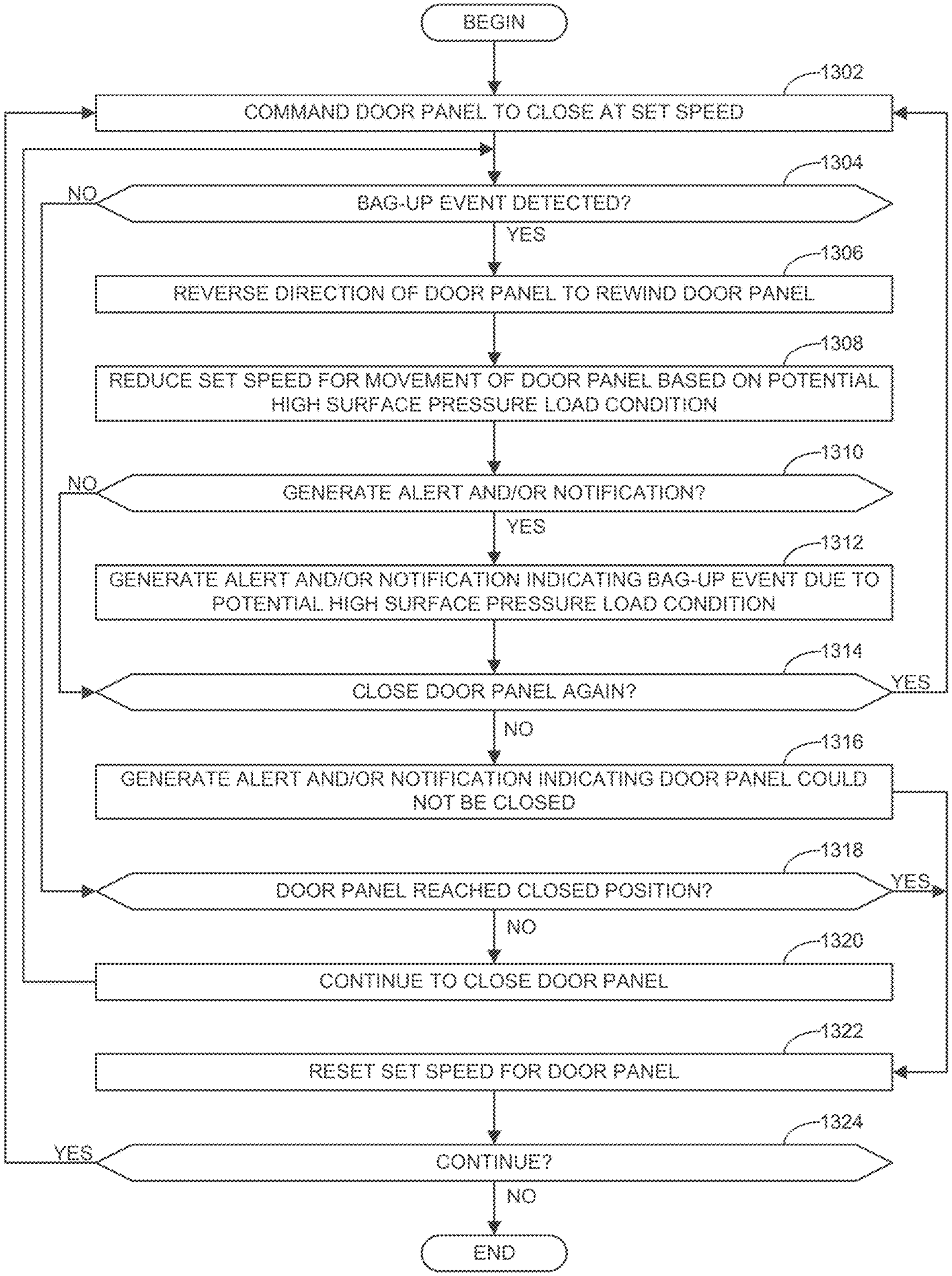

The example machine readable instructions and/or example operations of FIG. 13 begin at block 1302 where the example operations controller circuitry 1012 commands the door panel 102 to close at a set speed. At block 1304, the example sensor feedback analyzer circuitry 1010 determines whether a bag-up event is detected. A bag-up event can be detected based on feedback data from the example bag-up sensor 138. If a bag-up event is detected, control advances to block 1306 where the example operations controller circuitry 1012 reverses the direction of the door panel 102 to rewind the door panel 102. At block 1308, the example operations controller circuitry 1012 reduces the set speed for movement of the door panel 102 based on a potential high surface pressure load condition. Additionally or alternatively, the example operations controller circuitry 1012 can adjust the operation of the door to move the panel 102 in short incremental steps temporally spaced by periods of non-movement.

At block 1310, the example operations controller circuitry 1012 determines whether to generate an alert and/or notification. If so, control advances to block 1312 where the example operations controller circuitry 1012 generates an alert and/or notification indicating a bag-up event due to a potential high surface pressure load condition. In some examples, the network interface circuitry 1014 can transmit the alert and/or notification to a remote server and/or other remote devices associated with relevant personnel. Thereafter, control advances to block 1314. If no alert and/or notification is to be generated, as determined at block 1310, control advances directly to block 1314.

At block 1314, the operations controller circuitry 1012 determines whether to close the door panel 102 again. That is, the example operations controller circuitry 1012 determines whether to attempt to close the door panel 102 again during the detected high surface pressure load condition using the slower speed as set at block 1308. If the door panel 102 is to be closed again, control returns to block 1302. In some such examples, if a bag-up event is again detected at block 1304, the set speed can be reduced even further at block 1308 for another attempt at closing the door panel 102. If, at block 1314, the example operations controller circuitry 1012 determines not to close the door panel 102 again (e.g., a bag-up event is detected each time following a threshold number of attempts at closing the door panel 102), control advances to block 1316 where the example operations controller circuitry 1012 generates an alert and/or notification indicating the door panel 102 could not be closed. Thereafter, control advances to block 1322.

Returning to block 1304, if no bag-up event is detected, control advances to block 1318 where the example sensor feedback analyzer circuitry 1010 determines whether the door panel 102 has reached the fully closed position. If not, control advances to block 1320 where the example operations controller circuitry 1012 continues to close the door panel 102. Thereafter, control returns to block 1304. If the door panel 102 has reached the closed position, control advances to block 1322 where the operations controller circuitry 1012 resets the set speed for the door panel 102. Thereafter, control advances to block 1324 where the example operations controller circuitry 1012 determines whether to continue. If so, control returns to block 1302. Otherwise, the example process of FIG. 13 ends.

Figure 14:
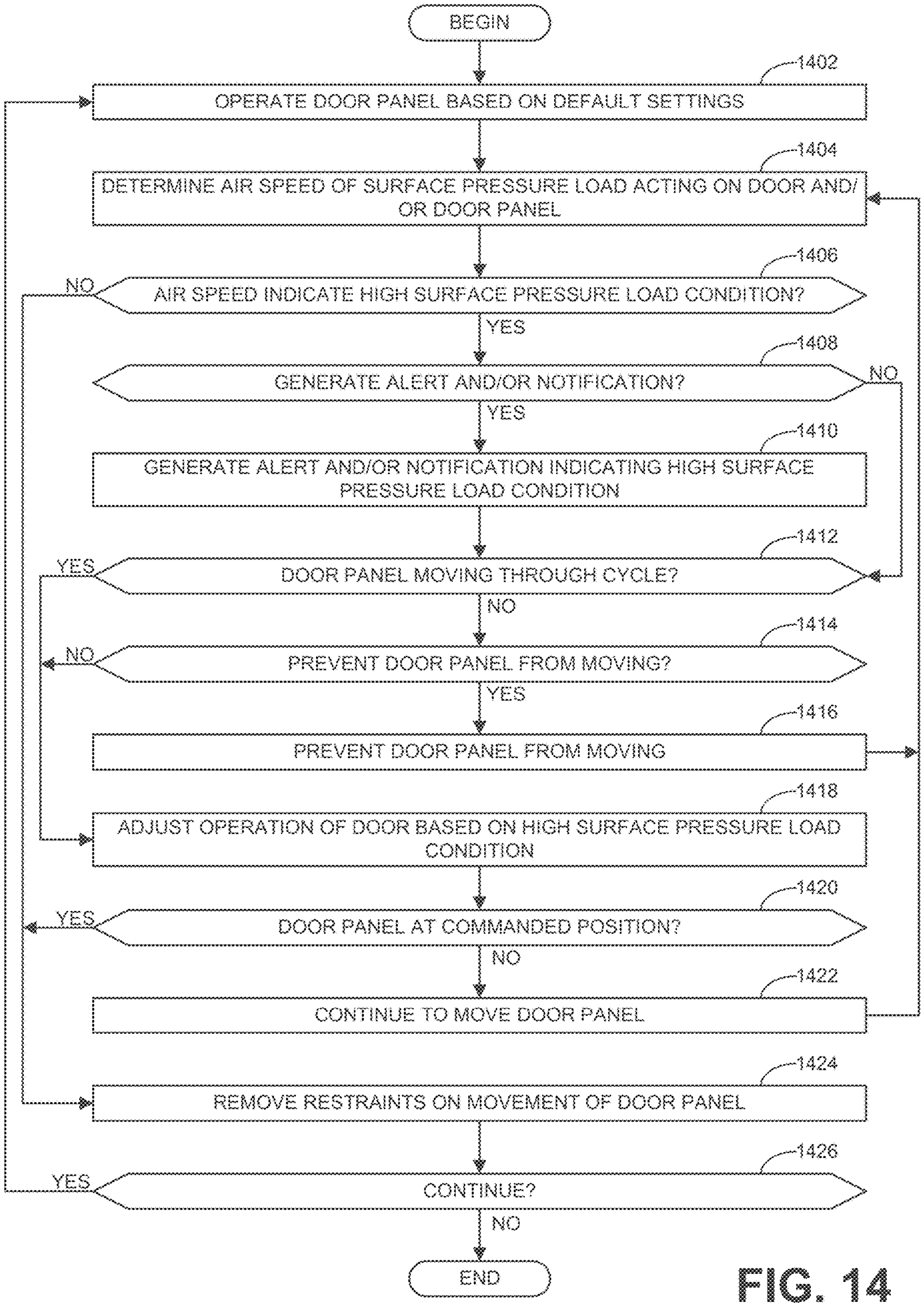

The example machine readable instructions and/or example operations of FIG. 14 begin at block 1402 with the example operations controller circuitry 1012 operating the door 100 based on default settings (e.g., settings configured for the door during normal operations). At block 1404, the example sensor feedback analyzer circuitry 1010 determines the air speed of a surface pressure load acting on the door 100 and/or the door panel 102. In some examples, the air speed is determined based on feedback from one or more surface pressure load sensors 142. At block 1406, the example sensor feedback analyzer circuitry 1010 determines whether the air speed indicates a high surface pressure load condition. In some examples, this determination is made based on whether the air speed satisfies (e.g., exceeds an air speed threshold). In some examples, multiple different levels of air speed conditions can be determined based on different air speeds. If the air speed indicates a high surface pressure load condition, control advances to block 1408 where the example operations controller circuitry 1012 determines whether to generate an alert and/or notification. If so, control advances to block 1410 where the example operations controller circuitry 1012 generates an alert and/or notification indicating a high surface pressure load condition. In some examples, the network interface circuitry 1014 can transmit the alert and/or notification to a remote server and/or other remote devices associated with relevant personnel. Thereafter, control advances to block 1412. If no alert and/or notification is to be generated at block 1412, control advances directly to block 1414.

At block 1412, the operations controller circuitry 1012 determines whether the door panel 102 is moving through a cycle. If not, control advances to block 1414 where the example operations controller circuitry 1012 determines whether to prevent the door panel 102 from moving. If so, control advances to block 1416 where the example operations controller circuitry 1012 prevents the door panel 102 from moving. In some examples, movement of the door panel 102 can be prevented logically, by the operations controller circuitry 1012 prohibiting commands to be sent to the drive unit 110 to move the door panel 102. Additionally or alternatively, movement of the door panel 102 can be prevented mechanically by the operations controller circuitry 1012 activating one or more wind locks 124. Thereafter, control returns to block 1404 to continue monitoring the air speed for changes.

Returning to block 1412, if the operations controller circuitry 1012 determines that the door panel 102 is moving through a cycle, control advances to block 1418. Similarly, if the operations controller circuitry 1012 determines, at block 1414, to not prevent the door panel 102 from moving, control advances to block 1418. At block 1418, the example operations controller circuitry 1012 adjusts operation of the door 100 based on the high surface pressure load condition. The particular way in which the operations of the door 100 are adjusted can depend on the circumstances of the door (e.g., the current position and/or direction of movement of the door panel 102 at the time the high surface pressure load condition is detected). In some examples, the door panel 102 can be stopped momentarily. In some examples, the door panel 102 is alternately stopped for brief periods and moved for brief periods to incrementally move the door panel 102 towards the commanded position. In some examples, the speed of the door panel 102 can be changed (e.g., reduced). In some examples, the direction of the door panel 102 can be reversed. In some examples, the position limits set for the door panel 102 can be adjusted.

After adjustment of the operation of the door 100 (block 1418), control advances to block 1420 where the example operations controller circuitry 1012 determines whether the door panel 102 is at its commanded position. The commanded position can correspond to the current position of the door panel 102 if it was not moving through a cycle (as determined at block 1412) or the final intended position of the door panel 102 after completing its current cycle. If the door panel 102 is not at a commanded position (e.g., the door panel 102 is moving through a commanded cycle), control advances to block 1422 where the example operations controller circuitry 1012 continues to move the door panel 102. Thereafter, control returns to block 1404. If the door panel 102 is at the commanded position, control advances to block 1424 where the operations controller circuitry 1012 removes restraints on the movement of the door panel 102. That is, the operations controller circuitry 1012 reverses any operations performed in connection with block 1416 when the door panel 102 was prevented from moving. At block 1426, the operations controller circuitry 1012 determines whether to continue. If so, control returns to block 1402. Otherwise, the example process of FIG. 14 ends.

FIGS. 15-19 are flowcharts the represent example machine readable instructions and/or example operations to enable the detection of misfeed events and the automatic correction of the same by implementing one or more refeed attempts. The example machine readable instructions and/or example operations of FIG. 15 begin at block 1502 where the example sensor feedback analyzer circuitry 1010 determines whether a signal from a misfeed sensor 126 indicates the door panel 102 is not within the track 108. If not, then the panel is assumed to be properly positioned such that there has been no misfeed event. Accordingly, control advances to block 1520. However, if a signal from the misfeed sensor 126 indicates the door panel 102 is not within the track 108, control advances to block 1504.

At block 1504, the example sensor feedback analyzer circuitry 1010 determines whether the door panel 102 is expected to be within the track 108. In some examples, this is determined based on a position of the door panel 102 determined based on feedback from an encoder associated with the drive unit 110 driving movement of the door panel 102. If the door panel 102 is not expected to be within the track 108, then the absence of the panel 102 from the track 108 (determined at block 1502) is not an indication of a misfeed and control advances to block 1520. However, if the door panel 102 is expected to be within the track 108, control advances to block 1506.

At block 1506, the example operations controller circuitry 1012 determines whether the door panel 102 has been missing from the track for a threshold amount of time and/or for a threshold travel distance. If not, then he signal from the misfeed sensor 126 may have been a false positive and/or the door panel 102 has already corrected its positioning such that there is no concern for a misfeed. Accordingly, control advances to block 1520. However, if the door panel is missing from the track 108 (e.g., is not detected by the misfeed sensor 126) for the threshold time and/or the threshold travel distance, control advances to block 1508.

At block 1508, the example operations controller circuitry 1012 records (e.g., in the example memory 1016) the position of the door panel 102 at the time the door panel 102 was detected missing from within the track 108. At block 1510, the example operations controller circuitry 1012 attempts to refeed the door panel 102 into the track 108. Example implementations of block 1510 are provided in further detail below in connection with FIGS. 16-19. At block 1512, the example sensor feedback analyzer circuitry 1010 determines whether the refeed attempt was successful. In some examples, a refeed attempt is successful if the misfeed sensor 126 no longer generates a signal indicating the door panel 102 is not within the track 108 when the panel 102 is expected to be within the track 108. If the refeed attempt was successful, control advances to block 1520. If the attempt was not successful, control advances to block 1514 where the example operations controller circuitry 1012 determines whether to attempt to refeed the door panel 102 into the track 108 again. In some examples, a threshold number of attempts may be performed before the example operations controller circuitry 1012 determines that no further attempts are to be made. If another attempt is to be made, control returns to block 1510. In some examples, different operational parameters may be used for different refeed attempts.

If the refeed attempt(s) are not successful and no further attempts are to be made, control advances to block 1516 where the example operations controller circuitry 1012 sets the door 100 to a fault state. At block 1518, the example operations controller circuitry 1012 generates an alert and/or notification indicating the door panel 102 could not be refed into the track 108. In some examples, the network interface circuitry 1014 can transmit the alert and/or notification to a remote server and/or other remote devices associated with relevant personnel. Thereafter, control advances to block 1520, where the controller 112 determines whether to continue the process. If so, control returns to block 1502. Otherwise, the example process of FIG. 15 ends.

Figure 15:
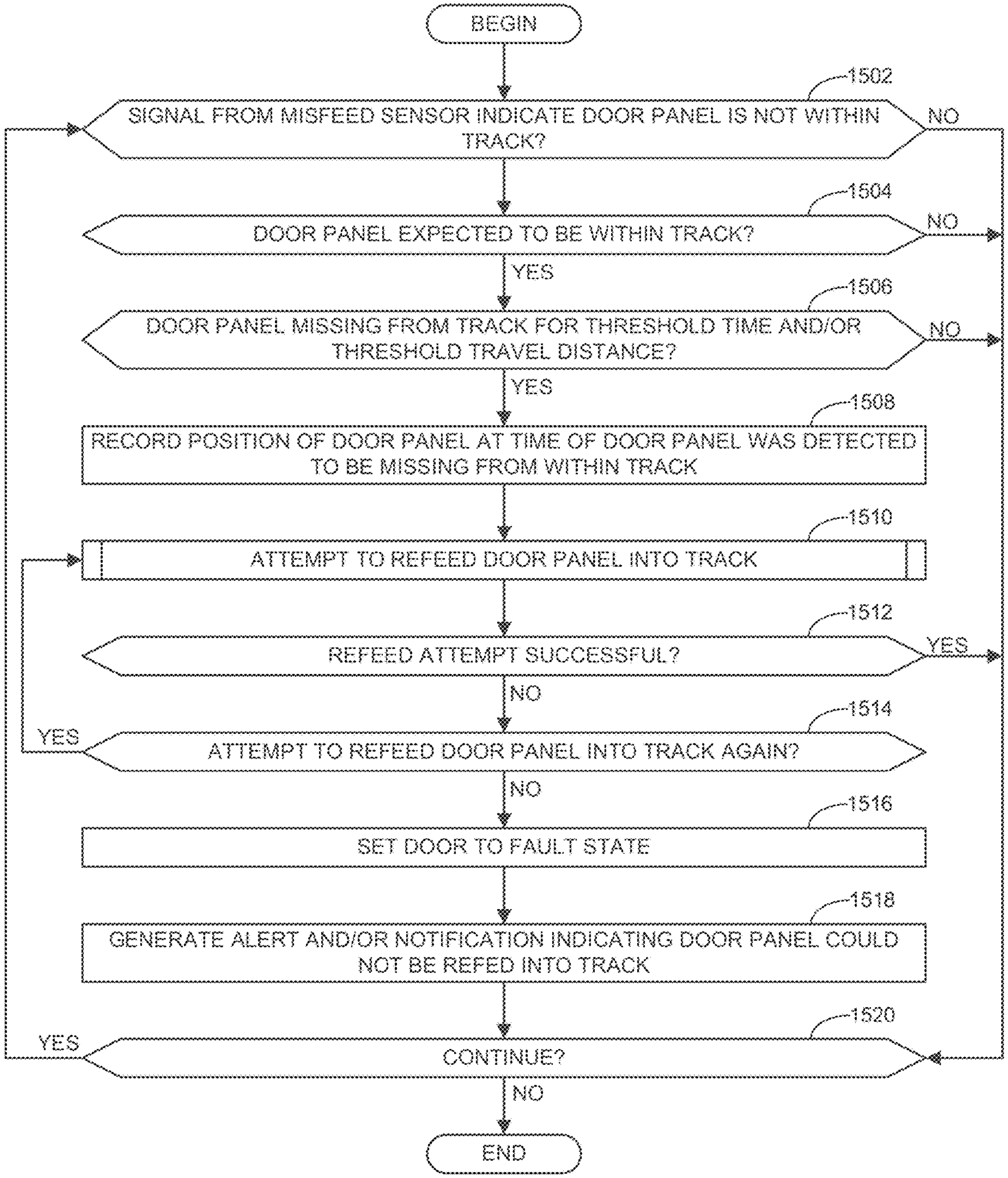

As noted above, FIG. 16 is a flowchart representative of example machine readable instructions and/or example operations to implement block 1510 of FIG. 15. The example machine readable instructions and/or example operations of FIG. 16 begin at block 1602 where the example operations controller circuitry 1012 moves the door panel 102 to the open position. Thereafter, at block 1604, the example operations controller circuitry 1012 moves the door panel toward the closed position at a different speed than used during the previous cycle. In some examples, the speed is faster than during the previous cycle. In some examples, the speed is slower than during the previous cycle. In some examples, the speed is a variable speed that changes with time (rather than being moved at a constant speed as during a normal door cycle). In some examples, the speed changes (e.g., increase or decreases) relative to the previous cycle only at the point in the cycle associated with when the misfeed event occurred (as recorded at block 1508 of FIG. 15). Thereafter, the example program of FIG. 16 ends and returns to complete the remainder of the process set forth in FIG. 15.

Figure 17:
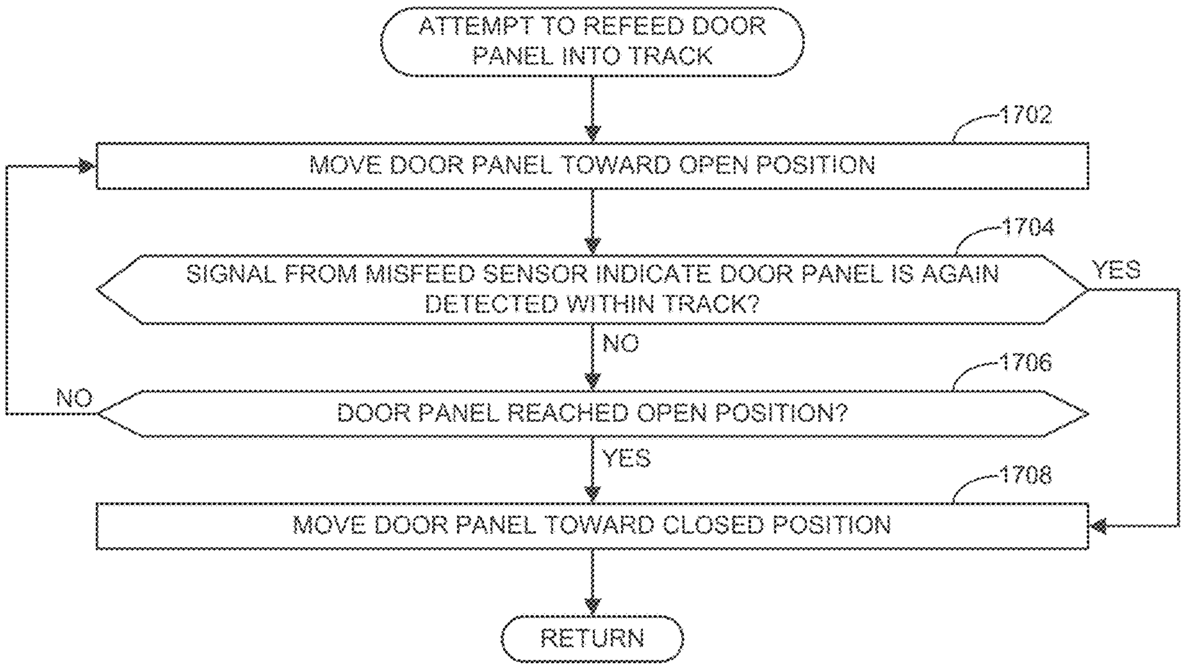

FIG. 17 is a flowchart representative of example machine readable instructions and/or example operations to implement block 1510 of FIG. 15. The example machine readable instructions and/or example operations of FIG. 17 begin at block 1702 where the example operations controller circuitry 1012 moves the door panel 102 toward the open position. As the door panel 102 continues to move, control advances to block 1604 where the example sensor feedback analyzer circuitry 1010 determines whether the signal from the misfeed sensor 126 indicates the door panel 102 is again detected within the track 108. If the door panel 102 is detected, it can be assumed the door panel below that point is within the track 108 such that there is no need to continue moving the door to the open position. Accordingly, in such situations, control advances to block 1708 where the example operations controller circuitry 1012 moves the door panel toward the closed position. In some examples, the operations controller circuitry 1012 moves the door panel 102 towards the open position slightly past the point when the door panel 102 is again detected by the misfeed sensor before reversing direction to move the panel 102 towards the closed position.

If, at block 1704, the door panel 102 is not detected, control advances to block 1706 where the example sensor feedback analyzer circuitry 1010 determines whether the door panel 102 has reached the open position. If not, control returns to block 1702 to continue moving the door panel 102 toward the open position. If the door panel has reached the open position, control advances to block 1708 to begin moving the door panel toward the closed position. Thereafter, the example program of FIG. 17 ends and returns to complete the remainder of the process set forth in FIG. 15.

Figure 16:
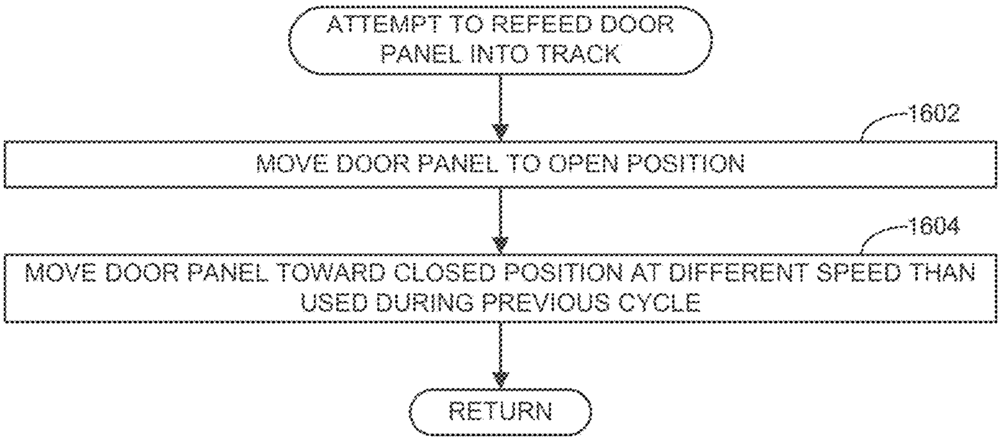

In some examples, the flowcharts represented in FIGS. 16 and 17 can be used in combination. For instance, in some examples, moving the door panel 102 toward the closed position at block 1708 in FIG. 17 can include adjustments to the door speed as discussed above in connection with block 1604 of FIG. 16.

Figure 18:
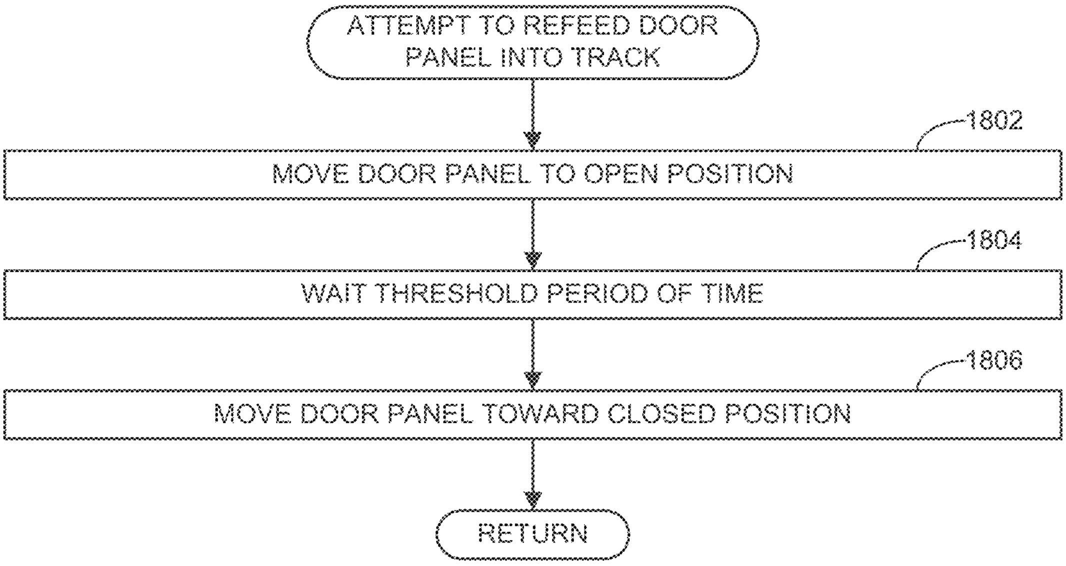

FIG. 18 is a flowchart representative of example machine readable instructions and/or example operations to implement block 1510 of FIG. 15. The example machine readable instructions and/or example operations of FIG. 18 begin at block 1802 where the example operations controller circuitry 1012 moves the door panel 102 to the open position. At block 1802, the example operations controller circuitry 1012 waits a threshold period of time. The threshold period of time can provide a delay to potentially allow a surface pressure load condition to subside that may have been the cause of the misfeed event that gave rise to the refeed attempt. In some examples the threshold period is a fixed period of time. In some examples, the threshold period of time can change between different refeed attempts. In some examples, the threshold period of time can depend on feedback from the surface pressure load sensor 122 indicating when a surface pressure load condition has subsided. After the threshold period of time, control advances to block 1806 where the example operations controller circuitry 1012 moves the door panel 102 toward the closed position. Thereafter, the example program of FIG. 18 ends and returns to complete the remainder of the process set forth in FIG. 15.

In some examples, the flowchart represented in FIG. 18 can be used in combination with either of the flowcharts of FIGS. 16 and 17. That is, in some examples, the delay for the threshold period of time can be included in FIG. 17 to wait to begin moving the door panel 102 to the closed position before the panel 102 fully reaches the open position. Further, different speeds, as discussed in connection with FIG. 16, can be implemented in connection with the moving of the door panel 102 toward the closed position in FIG. 18.

Figure 19:
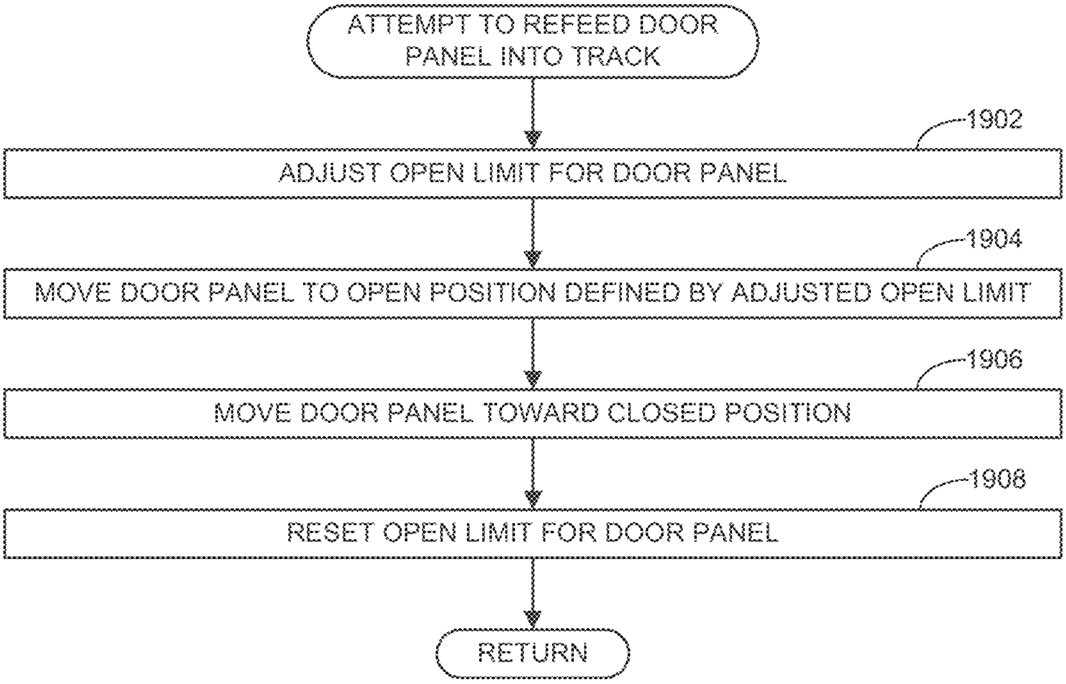

FIG. 19 is a flowchart representative of example machine readable instructions and/or example operations to implement block 1510 of FIG. 15. The example machine readable instructions and/or example operations of FIG. 19 begin at block 1902 where the example operations controller circuitry 1012 adjust an open limit for the door panel 102. The open limit defines the position at which the door panel 102 is to be located when the fully open position. In some examples, the open limit can be adjusted either higher or lower than set in the previous door cycle. At block 1904, the example operations controller circuitry 1012 moves the door panel 102 to the open position defined by the adjusted open limit. Thereafter, at block 1906, the example operations controller circuitry 1012 moves the door panel 102 toward the closed position. At block 1906, the example operations controller circuitry 1012 resets the open limit for the door panel 102. In some examples, block 1906 is omitted. Thereafter, the example program of FIG. 19 ends and returns to complete the remainder of the process set forth in FIG. 15. In some examples, the flowchart represented in FIG. 19 can be used in combination with any one of the flowcharts of FIGS. 16-18.

Figure 20:
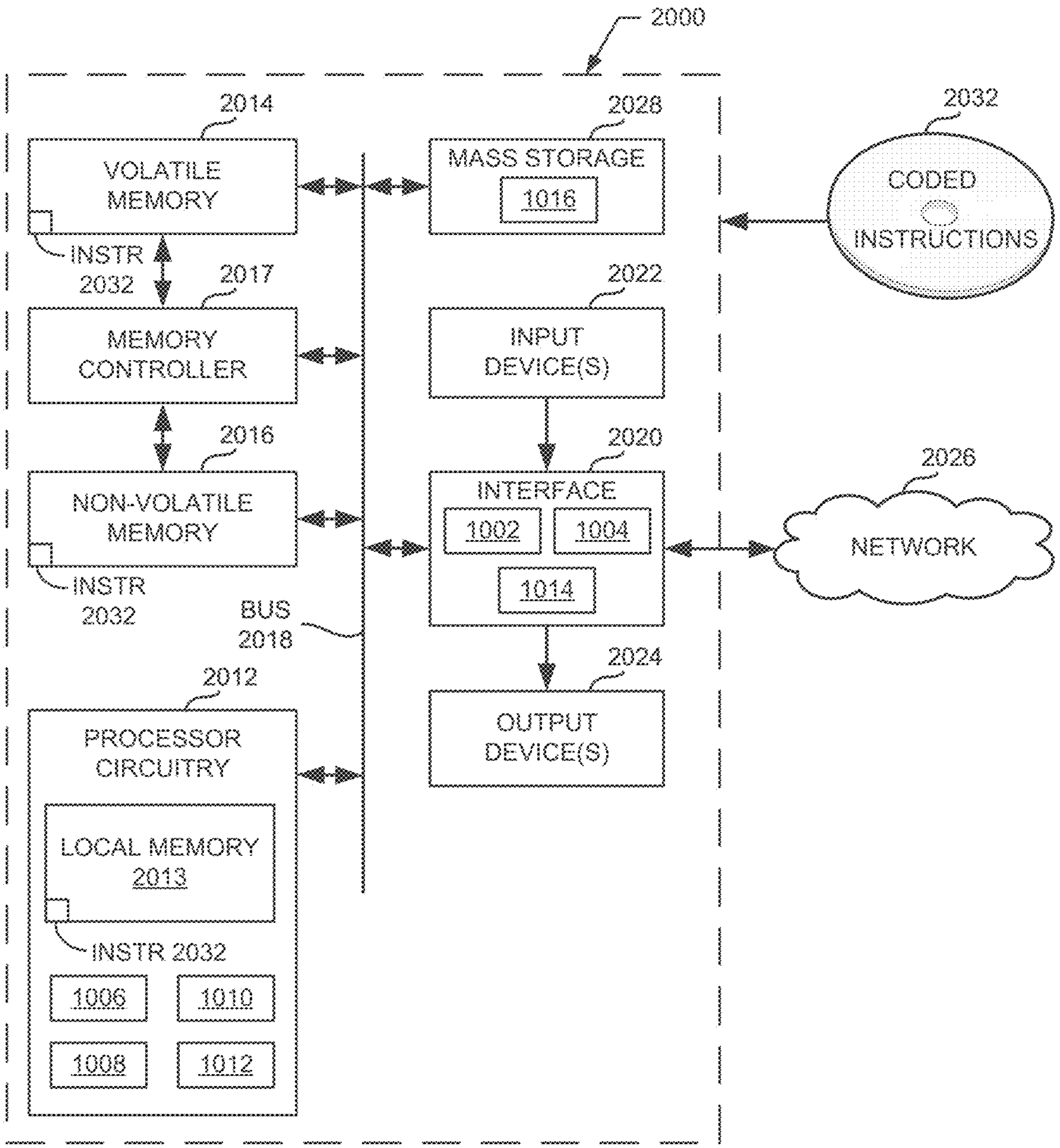
FIG. 20 is a block diagram of an example processing platform including processor circuitry structured to execute the example machine readable instructions and/or the example operations of FIGS. 11-19 to implement the example controller of FIGS. 1-3, 8, and/or 10.

FIG. 20 is a block diagram of an example processor platform 2000 structured to execute and/or instantiate the machine readable instructions and/or the operations of FIGS. 11-19 to implement the controller 112 of FIGS. 1 and/or 10. The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), or any other type of computing device.

The processor platform 2000 of the illustrated example includes a processor circuitry 2012. The processor circuitry 2012 of the illustrated example is hardware. For example, the processor circuitry 2012 can be implemented by one or more integrated circuits, logic circuits, FPGAs, microprocessors, CPUs, GPUs, DSPs, and/or microcontrollers from any desired family or manufacturer. The processor circuitry 2012 may be implemented by one or more semiconductor based (e.g., silicon based) device. In this example, the processor circuitry 2012 implements the example timestamp generator circuitry 1006, the example data logger circuitry 1008, the example sensor feedback analyzer circuitry 1010, and the example operations controller circuitry 1012.

The processor circuitry 2012 of the illustrated example includes a local memory 2013 (e.g., a cache, registers, etc.). The processor circuitry 2012 of the illustrated example is in communication with a main memory including a volatile memory 2014 and a non-volatile memory 2016 via a bus 2018. The volatile memory 2014 can be implemented by Synchronous Dynamic Random Access Memory (SDRAM), Dynamic Random Access Memory (DRAM), RAMBUS® Dynamic Random Access Memory (RDRAM®) and/or any other type of RAM device. The non-volatile memory 2016 can be implemented by flash memory and/or any other desired type of memory device. Access to the main memory 2014, 2016 is controlled by a memory controller 2017.

The processor platform 2000 of the illustrated example also includes interface circuitry 2020. The interface circuitry 2020 can be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuit implements the equipment interface circuitry 1002 and the example user interface circuitry 1004, and the example network interface circuitry 1014.

In the illustrated example, one or more input devices 2022 are connected to the interface circuitry 2020. The input device(s) 2022 permit(s) a user to enter data and/or commands into the processor circuitry 2012. The input device(s) can be implemented by, for example, an audio sensor, a microphone, a camera (still or video), a keyboard, a button, a mouse, a touchscreen, a track-pad, a trackball, an isopoint device, and/or a voice recognition system.

One or more output devices 2024 are also connected to the interface circuitry 2020 of the illustrated example. The output devices 2024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer and/or speaker. The interface circuitry 2020 of the illustrated example, thus, typically includes a graphics driver card, a graphics driver chip and/or graphics processor circuitry such as a GPU.

The interface circuitry 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2026. The communication can be via, for example, an Ethernet connection, a digital subscriber line (DSL) connection, a telephone line connection, a coaxial cable system, a satellite system, a line-of-site wireless system, a cellular telephone system, an optical connection, etc.

The processor platform 2000 of the illustrated example also includes one or more mass storage devices 2028 to store software and/or data. Examples of such mass storage devices 2028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the mass storage device 2028 implements the example memory 1016.

The machine readable instructions 2032, which may be implemented by the machine readable instructions of FIGS. 11-19 can be stored in the mass storage device 2028, in the volatile memory 2014, in the non-volatile memory 2016, and/or on a removable non-transitory computer readable storage medium such as a CD or DVD.

Figure 21:
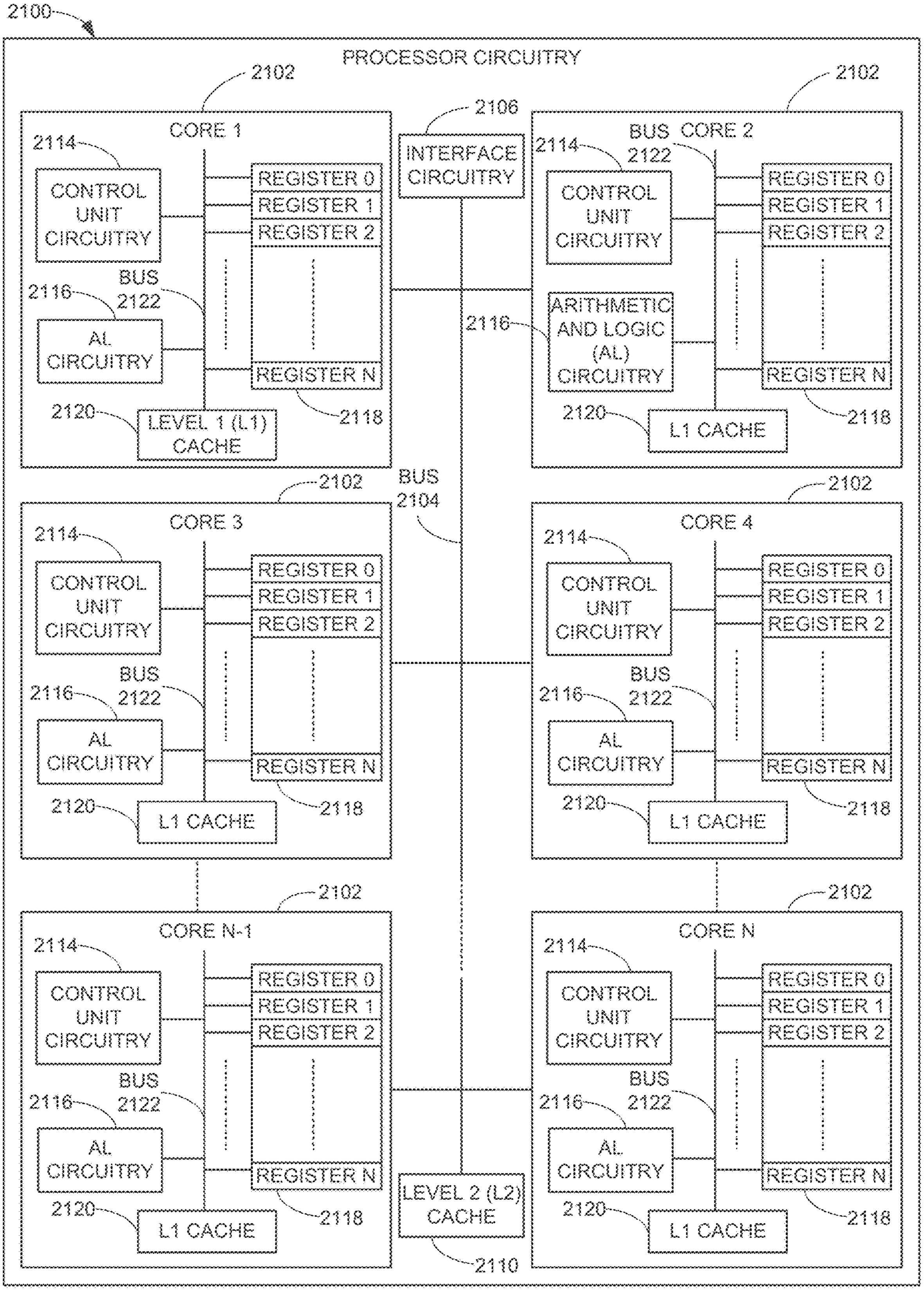
FIG. 21 is a block diagram of an example implementation of the processor circuitry of FIG. 20.

FIG. 21 is a block diagram of an example implementation of the processor circuitry 2012 of FIG. 20. In this example, the processor circuitry 2012 of FIG. 20 is implemented by a microprocessor 2100. For example, the microprocessor 2100 may be a general purpose microprocessor (e.g., general purpose microprocessor circuitry). The microprocessor 2100 executes some or all of the machine readable instructions of the flowcharts of FIGS. 11-19 to effectively instantiate the circuitry of FIG. 10 as logic circuits to perform the operations corresponding to those machine readable instructions. In some such examples, the circuitry of FIG. 10 is instantiated by the hardware circuits of the microprocessor 2100 in combination with the instructions. For example, the microprocessor 2100 may be implemented by multi-core hardware circuitry such as a CPU, a DSP, a GPU, an XPU, etc. Although it may include any number of example cores 2102 (e.g., 1 core), the microprocessor 2100 of this example is a multi-core semiconductor device including N cores. The cores 2102 of the microprocessor 2100 may operate independently or may cooperate to execute machine readable instructions. For example, machine code corresponding to a firmware program, an embedded software program, or a software program may be executed by one of the cores 2102 or may be executed by multiple ones of the cores 2102 at the same or different times. In some examples, the machine code corresponding to the firmware program, the embedded software program, or the software program is split into threads and executed in parallel by two or more of the cores 2102. The software program may correspond to a portion or all of the machine readable instructions and/or operations represented by the flowcharts of FIGS. 11-19.

The cores 2102 may communicate by a first example bus 2104. In some examples, the first bus 2104 may be implemented by a communication bus to effectuate communication associated with one(s) of the cores 2102. For example, the first bus 2104 may be implemented by at least one of an Inter-Integrated Circuit (I2C) bus, a Serial Peripheral Interface (SPI) bus, a PCI bus, or a PCIe bus. Additionally or alternatively, the first bus 2104 may be implemented by any other type of computing or electrical bus. The cores 2102 may obtain data, instructions, and/or signals from one or more external devices by example interface circuitry 2106. The cores 2102 may output data, instructions, and/or signals to the one or more external devices by the interface circuitry 2106. Although the cores 2102 of this example include example local memory 2120 (e.g., Level 1 (L1) cache that may be split into an L1 data cache and an L1 instruction cache), the microprocessor 2100 also includes example shared memory 2110 that may be shared by the cores (e.g., Level 2 (L2 cache)) for high-speed access to data and/or instructions. Data and/or instructions may be transferred (e.g., shared) by writing to and/or reading from the shared memory 2110. The local memory 2120 of each of the cores 2102 and the shared memory 2110 may be part of a hierarchy of storage devices including multiple levels of cache memory and the main memory (e.g., the main memory 2014, 2016 of FIG. 20). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2102 may be referred to as a CPU, DSP, GPU, etc., or any other type of hardware circuitry. Each core 2102 includes control unit circuitry 2114, arithmetic and logic (AL) circuitry (sometimes referred to as an ALU) 2116, a plurality of registers 2118, the local memory 2120, and a second example bus 2122. Other structures may be present. For example, each core 2102 may include vector unit circuitry, single instruction multiple data (SIMD) unit circuitry, load/store unit (LSU) circuitry, branch/jump unit circuitry, floating-point unit (FPU) circuitry, etc. The control unit circuitry 2114 includes semiconductor-based circuits structured to control (e.g., coordinate) data movement within the corresponding core 2102. The AL circuitry 2116 includes semiconductor-based circuits structured to perform one or more mathematic and/or logic operations on the data within the corresponding core 2102. The AL circuitry 2116 of some examples performs integer based operations. In other examples, the AL circuitry 2116 also performs floating point operations. In yet other examples, the AL circuitry 2116 may include first AL circuitry that performs integer based operations and second AL circuitry that performs floating point operations. In some examples, the AL circuitry 2116 may be referred to as an Arithmetic Logic Unit (ALU). The registers 2118 are semiconductor-based structures to store data and/or instructions such as results of one or more of the operations performed by the AL circuitry 2116 of the corresponding core 2102. For example, the registers 2118 may include vector register(s), SIMD register(s), general purpose register(s), flag register(s), segment register(s), machine specific register(s), instruction pointer register(s), control register(s), debug register(s), memory management register(s), machine check register(s), etc. The registers 2118 may be arranged in a bank as shown in FIG. 21. Alternatively, the registers 2118 may be organized in any other arrangement, format, or structure including distributed throughout the core 2102 to shorten access time. The second bus 2122 may be implemented by at least one of an I2C bus, a SPI bus, a PCI bus, or a PCIe bus Each core 2102 and/or, more generally, the microprocessor 2100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 22:
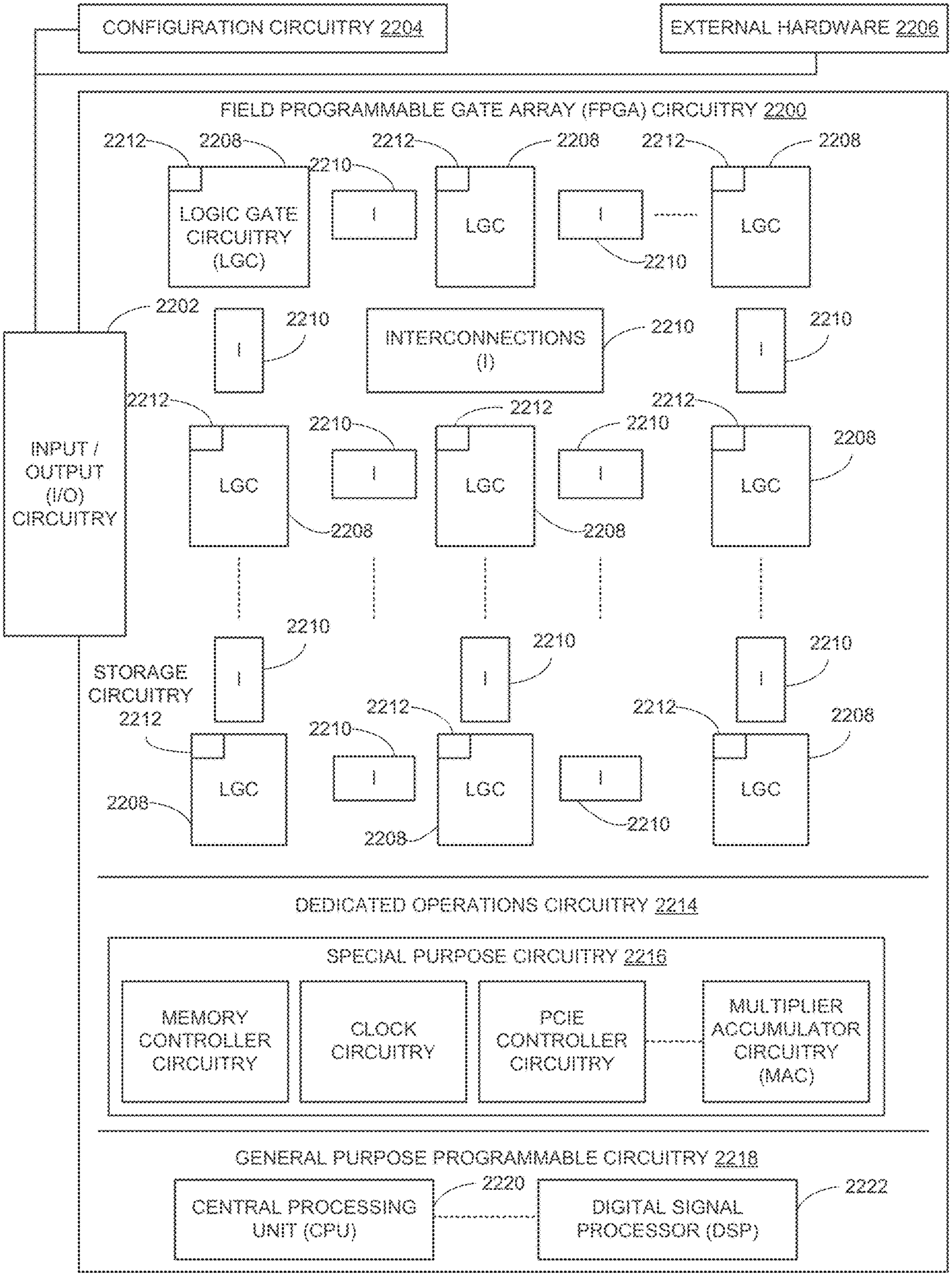
FIG. 22 is a block diagram of another example implementation of the processor circuitry of FIG. 20.

FIG. 22 is a block diagram of another example implementation of the processor circuitry 2012 of FIG. 20. In this example, the processor circuitry 2012 is implemented by FPGA circuitry 2200. For example, the FPGA circuitry 2200 may be implemented by an FPGA. The FPGA circuitry 2200 can be used, for example, to perform operations that could otherwise be performed by the example microprocessor 2100 of FIG. 21 executing corresponding machine readable instructions. However, once configured, the FPGA circuitry 2200 instantiates the machine readable instructions in hardware and, thus, can often execute the operations faster than they could be performed by a general purpose microprocessor executing the corresponding software.

More specifically, in contrast to the microprocessor 2100 of FIG. 21 described above (which is a general purpose device that may be programmed to execute some or all of the machine readable instructions represented by the flowcharts of FIGS. 11-19 but whose interconnections and logic circuitry are fixed once fabricated), the FPGA circuitry 2200 of the example of FIG. 22 includes interconnections and logic circuitry that may be configured and/or interconnected in different ways after fabrication to instantiate, for example, some or all of the machine readable instructions represented by the flowcharts of FIGS. 11-19. In particular, the FPGA circuitry 2200 may be thought of as an array of logic gates, interconnections, and switches. The switches can be programmed to change how the logic gates are interconnected by the interconnections, effectively forming one or more dedicated logic circuits (unless and until the FPGA circuitry 2200 is reprogrammed). The configured logic circuits enable the logic gates to cooperate in different ways to perform different operations on data received by input circuitry. Those operations may correspond to some or all of the software represented by the flowcharts of FIGS. 11-19. As such, the FPGA circuitry 2200 may be structured to effectively instantiate some or all of the machine readable instructions of the flowcharts of FIGS. 11-19 as dedicated logic circuits to perform the operations corresponding to those software instructions in a dedicated manner analogous to an ASIC. Therefore, the FPGA circuitry 2200 may perform the operations corresponding to the some or all of the machine readable instructions of FIGS. 11-19 faster than the general purpose microprocessor can execute the same.

In the example of FIG. 22, the FPGA circuitry 2200 is structured to be programmed (and/or reprogrammed one or more times) by an end user by a hardware description language (HDL) such as Verilog. The FPGA circuitry 2200 of FIG. 22, includes example input/output (I/O) circuitry 2202 to obtain and/or output data to/from example configuration circuitry 2204 and/or external hardware 2206. For example, the configuration circuitry 2204 may be implemented by interface circuitry that may obtain machine readable instructions to configure the FPGA circuitry 2200, or portion(s) thereof. In some such examples, the configuration circuitry 2204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2206 may be implemented by external hardware circuitry. For example, the external hardware 2206 may be implemented by the microprocessor 2100 of FIG. 21. The FPGA circuitry 2200 also includes an array of example logic gate circuitry 2208, a plurality of example configurable interconnections 2210, and example storage circuitry 2212. The logic gate circuitry 2208 and the configurable interconnections 2210 are configurable to instantiate one or more operations that may correspond to at least some of the machine readable instructions of FIGS. 11-19 and/or other desired operations. The logic gate circuitry 2208 shown in FIG. 22 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2208 to enable configuration of the electrical structures and/or the logic gates to form circuits to perform desired operations. The logic gate circuitry 2208 may include other electrical structures such as look-up tables (LUTs), registers (e.g., flip-flops or latches), multiplexers, etc.

The configurable interconnections 2210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2208 to program desired logic circuits.

The storage circuitry 2212 of the illustrated example is structured to store result(s) of the one or more of the operations performed by corresponding logic gates. The storage circuitry 2212 may be implemented by registers or the like. In the illustrated example, the storage circuitry 2212 is distributed amongst the logic gate circuitry 2208 to facilitate access and increase execution speed.

The example FPGA circuitry 2200 of FIG. 22 also includes example Dedicated Operations Circuitry 2214. In this example, the Dedicated Operations Circuitry 2214 includes special purpose circuitry 2216 that may be invoked to implement commonly used functions to avoid the need to program those functions in the field. Examples of such special purpose circuitry 2216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2200 may also include example general purpose programmable circuitry 2218 such as an example CPU 2220 and/or an example DSP 2222. Other general purpose programmable circuitry 2218 may additionally or alternatively be present such as a GPU, an XPU, etc., that can be programmed to perform other operations.

Although FIGS. 21 and 22 illustrate two example implementations of the processor circuitry 2012 of FIG. 20, many other approaches are contemplated. For example, as mentioned above, modern FPGA circuitry may include an on-board CPU, such as one or more of the example CPU 2220 of FIG. 22. Therefore, the processor circuitry 2012 of FIG. 20 may additionally be implemented by combining the example microprocessor 2100 of FIG. 21 and the example FPGA circuitry 2200 of FIG. 22. In some such hybrid examples, a first portion of the machine readable instructions represented by the flowcharts of FIGS. 11-19 may be executed by one or more of the cores 2102 of FIG. 21, a second portion of the machine readable instructions represented by the flowcharts of FIGS. 11-19 may be executed by the FPGA circuitry 2200 of FIG. 22, and/or a third portion of the machine readable instructions represented by the flowcharts of FIGS. 11-19 may be executed by an ASIC. It should be understood that some or all of the circuitry of FIG. 10 may, thus, be instantiated at the same or different times. Some or all of the circuitry may be instantiated, for example, in one or more threads executing concurrently and/or in series. Moreover, in some examples, some or all of the circuitry of FIG. 10 may be implemented within one or more virtual machines and/or containers executing on the microprocessor.

In some examples, the processor circuitry 2012 of FIG. 20 may be in one or more packages. For example, the microprocessor 2100 of FIG. 21 and/or the FPGA circuitry 2200 of FIG. 22 may be in one or more packages. In some examples, an XPU may be implemented by the processor circuitry 2012 of FIG. 20, which may be in one or more packages. For example, the XPU may include a CPU in one package, a DSP in another package, a GPU in yet another package, and an FPGA in still yet another package.

Figure 23:
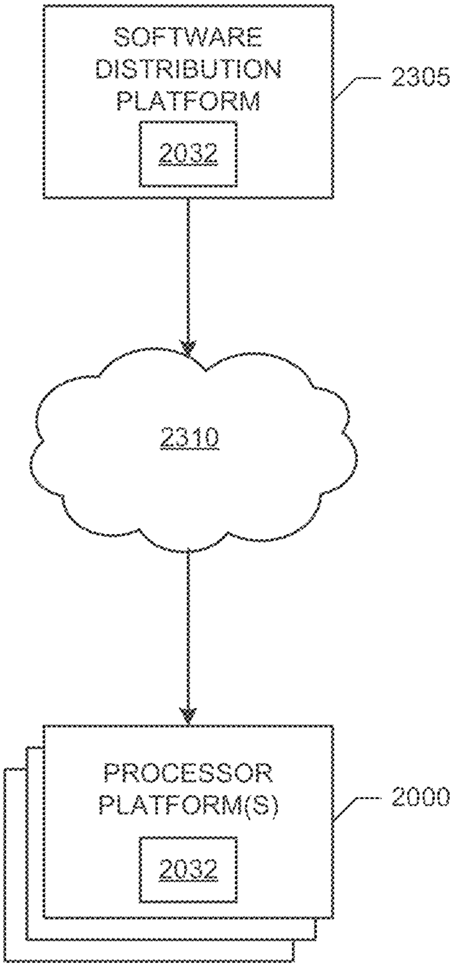
FIG. 23 is a block diagram of an example software distribution platform (e.g., one or more servers) to distribute software (e.g., software corresponding to the example machine readable instructions of FIGS. 11-19) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2305 to distribute software such as the example machine readable instructions 2032 of FIG. 20 to hardware devices owned and/or operated by third parties is illustrated in FIG. 23. The example software distribution platform 2305 may be implemented by any computer server, data facility, cloud service, etc., capable of storing and transmitting software to other computing devices. The third parties may be customers of the entity owning and/or operating the software distribution platform 2305. For example, the entity that owns and/or operates the software distribution platform 2305 may be a developer, a seller, and/or a licensor of software such as the example machine readable instructions 2032 of FIG. 20. The third parties may be consumers, users, retailers, OEMs, etc., who purchase and/or license the software for use and/or re-sale and/or sub-licensing. In the illustrated example, the software distribution platform 2305 includes one or more servers and one or more storage devices. The storage devices store the machine readable instructions 2032, which may correspond to the example machine readable instructions of FIGS. 11-19, as described above. The one or more servers of the example software distribution platform 2305 are in communication with an example network 2310, which may correspond to any one or more of the Internet and/or any of the example networks 2026 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2032 from the software distribution platform 2305. For example, the software, which may correspond to the example machine readable instructions of FIGS. 11-19, may be downloaded to the example processor platform 2000, which is to execute the machine readable instructions 2032 to implement the controller 112. In some examples, one or more servers of the software distribution platform 2305 periodically offer, transmit, and/or force updates to the software (e.g., the example machine readable instructions 2032 of FIG. 20) to ensure improvements, patches, updates, etc., are distributed and applied to the software at the end user devices.

From the foregoing, it will be appreciated that example methods, apparatus and articles of manufacture have been disclosed that enable the automatic (e.g., without direct human intervention) adjustment of the operation of a power operated door in response to the detection of a high surface pressure load condition. Adjustments to the operations of the door can include changing the speed of the door (or stopping the door), changing the direction of movement of the door, changing position limits set for the door, and/or activating/deactivating wind locks associated with the door. These adjustments can reduce (e.g., avoid) damage and wear to the door panel and/or to the motor driving the door panel that can arise from the high amounts of friction that can result under relatively high surface pressure loads. Furthermore, these automatic adjustments can facilitate the opening and closing of doors that can otherwise get stuck in high surface pressure load conditions, thereby increasing the efficiency of operations.

Further examples and combinations thereof include the following:

Example 1 includes an apparatus comprising sensor feedback analyzer circuitry to detect a surface pressure load acting on a door based on feedback from a sensor, the door including a panel to move along a track, and operations controller circuitry to control operations of the door, the operations controller circuitry to automatically adjust an operation of the door in response to detection of the surface pressure load.

Example 2 includes the apparatus of example 1, wherein the sensor is a bag-up sensor.

Example 3 includes the apparatus of example 1, wherein the sensor is an encoder to monitor at least one of a position or a speed of rotation of a motor indicative of a at least one of a position or a speed of the panel.

Example 4 includes the apparatus of example 3, wherein the sensor feedback analyzer circuitry is to detect the surface pressure load acting on the door when the speed of the panel is less than a commanded speed by a speed threshold.

Example 5 includes the apparatus of example 4, wherein the sensor feedback analyzer circuitry is to determine a deceleration of the panel by tracking the speed of the panel over time, detect the surface pressure load when the deceleration is less than a deceleration threshold, and determine an object is obstructing a path of the panel when the deceleration is greater than the deceleration threshold.

Example 6 includes the apparatus of example 1, wherein the feedback from the sensor includes a current drawn by a motor that drives the panel.

Example 7 includes the apparatus of example 1, wherein the sensor is a surface pressure load sensor.

Example 8 includes the apparatus of example 7, wherein the surface pressure load sensor is at least one of an anemometer, a differential pressure sensor, or an air flow sensor.

Example 9 includes the apparatus of example 1, wherein the adjustment to the operation of the door includes commanding the panel to move at a reduced speed relative to a speed before the surface pressure load was detected.

Example 10 includes the apparatus of example 1, wherein the adjustment to the operation of the door includes reversing a direction of movement of the panel.

Example 11 includes the apparatus of example 1, wherein the adjustment to the operation of the door includes adjusting a position limit set for the panel.

Example 12 includes the apparatus of example 1, wherein the adjustment to the operation of the door includes preventing the panel from moving.

Example 13 includes the apparatus of example 12, wherein the preventing the panel from moving includes activating a wind lock associated with the door.

Example 14 includes the apparatus of example 1, wherein the adjustment to the operation of the door includes causing the panel to move in successive increments temporally spaced by periods of non-movement, the increments being less than a full travel distance of the panel.

Example 15 includes the apparatus of example 1, wherein the sensor feedback analyzer circuitry is to detect at least a portion of a lateral edge of the panel missing from within the track based on feedback from a misfeed sensor positioned adjacent an upper end of the track.

Example 16 includes the apparatus of example 15, wherein the operations controller circuitry is to control operations of the door to attempt to refeed the panel into the track in response to the detection of the panel missing from within the track.

Example 17 includes the apparatus of example 16, wherein the attempt to refeed the panel includes moving the panel toward an open position followed by moving the panel toward a closed position.

Example 18 includes the apparatus of example 17, wherein the operations controller circuitry is to reverse direction of the panel from moving toward the open position to moving toward the closed position before the panel reaches a fully open position, the reversal of direction based on feedback from the misfeed sensor indicating the panel is detected within the track.

Example 19 includes the apparatus of example 17, wherein the operations controller circuitry is to change a speed of movement of the door when moving the panel toward the closed position relative to a speed of movement of the door prior to detecting of the panel missing from within the track.

Example 20 includes the apparatus of example 17, wherein the operations controller circuitry is to wait a threshold period of time between the moving of the panel toward the open position and the moving of the panel toward the closed position.

Example 21 includes the apparatus of example 17, wherein the operations controller circuitry is to adjust an open limit defining a fully open position for the panel prior to moving the panel toward the open position.

Example 22 includes an apparatus comprising at least one memory, instructions, and processor circuitry to execute the instructions to detect a surface pressure load acting on a door based on feedback from a sensor, the door including a panel to move along a track, and automatically adjust an operation of the door in response to detection of the surface pressure load.

Example 23 includes the apparatus of example 22, wherein the sensor is a bag-up sensor.

Example 24 includes the apparatus of example 22, wherein the sensor is an encoder that monitors at least one of a position or a speed of rotation of a motor indicative of a at least one of a position or a speed of the panel.

Example 25 includes the apparatus of example 24, wherein the processor circuitry is to detect the surface pressure load acting on the door when the speed of the panel is less than a commanded speed by a speed threshold.

Example 26 includes the apparatus of example 25, wherein the processor circuitry is to determine a deceleration of the panel by tracking the speed of the panel over time, detect the surface pressure load when the deceleration is less than a deceleration threshold, and determine an object is obstructing a path of the panel when the deceleration is greater than the deceleration threshold.

Example 27 includes the apparatus of example 22, wherein the feedback from the sensor includes a current drawn by a motor that drives the panel.

Example 28 includes the apparatus of example 22, wherein the sensor is a surface pressure load sensor.

Example 29 includes the apparatus of example 28, wherein the surface pressure load sensor is at least one of an anemometer, a differential pressure sensor, or an air flow sensor.

Example 30 includes the apparatus of example 22, wherein the adjustment to the operation of the door includes commanding the panel to move at a reduced speed relative to a speed before the surface pressure load was detected.

Example 31 includes the apparatus of example 22, wherein the adjustment to the operation of the door includes reversing a direction of movement of the panel.

Example 32 includes the apparatus of example 22, wherein the adjustment to the operation of the door includes adjusting a position limit set for the panel.

Example 33 includes the apparatus of example 22, wherein the adjustment to the operation of the door includes preventing the panel from moving.

Example 34 includes the apparatus of example 33, wherein the preventing the panel from moving includes activating a wind lock associated with the door.

Example 35 includes the apparatus of example 22, wherein the adjustment to the operation of the door includes causing the panel to move in successive increments temporally spaced by periods of non-movement, the increments being less than a full travel distance of the panel.

Example 36 includes the apparatus of example 22, wherein the processor circuitry is to detect at least a portion of a lateral edge of the panel missing from within the track based on feedback from a misfeed sensor positioned adjacent an upper end of the track.

Example 37 includes the apparatus of example 36, wherein the processor circuitry is to control operations of the door to attempt to refeed the panel into the track in response to the detection of the panel missing from within the track.

Example 38 includes the apparatus of example 37, wherein the attempt to refeed the panel includes moving the panel toward an open position followed by moving the panel toward a closed position.

Example 39 includes the apparatus of example 38, wherein the processor circuitry is to reverse direction of the panel from moving toward the open position to moving toward the closed position before the panel reaches a fully open position, the reversal of direction based on feedback from the misfeed sensor indicating the panel is detected within the track.

Example 40 includes the apparatus of example 38, wherein the processor circuitry is to change a speed of movement of the door when moving the panel toward the closed position relative to a speed of movement of the door prior to detecting of the panel missing from within the track.

Example 41 includes the apparatus of example 38, wherein the processor circuitry is to wait a threshold period of time between the moving of the panel toward the open position and the moving of the panel toward the closed position.

Example 42 includes the apparatus of example 38, wherein the processor circuitry is to adjust an open limit defining a fully open position for the panel prior to moving the panel toward the open position.

Example 43 includes a non-transitory computer readable medium comprising instructions that, when executed, cause a machine to at least control operations of a door, the door including a panel to move along a track, detect a surface pressure load acting on the door based on feedback from a sensor, and automatically adjust an operation of the door in response to detection of the surface pressure load.

Example 44 includes the non-transitory computer readable medium of example 43, wherein the sensor is a bag-up sensor.

Example 45 includes the non-transitory computer readable medium of example 43, wherein the sensor is an encoder that monitors at least one of a position or a speed of rotation of a motor indicative of a at least one of a position or a speed of the panel.

Example 46 includes the non-transitory computer readable medium of example 45, wherein the instructions cause the machine to detect the surface pressure load acting on the door when the speed of the panel is less than a commanded speed by a speed threshold.

Example 47 includes the non-transitory computer readable medium of example 46, wherein the instructions cause the machine to determine a deceleration of the panel by tracking the speed of the panel over time, detect the surface pressure load when the deceleration is less than a deceleration threshold, and determine an object is obstructing a path of the panel when the deceleration is greater than the deceleration threshold.

Example 48 includes the non-transitory computer readable medium of example 43, wherein the feedback from the sensor includes a current drawn by a motor that drives the panel.

Example 49 includes the non-transitory computer readable medium of example 43, wherein the sensor is a surface pressure load sensor.

Example 50 includes the non-transitory computer readable medium of example 49, wherein the surface pressure load sensor is at least one of an anemometer, a differential pressure sensor, or an air flow sensor.

Example 51 includes the non-transitory computer readable medium of example 43, wherein the adjustment to the operation of the door includes commanding the panel to move at a reduced speed relative to a speed before the surface pressure load was detected.

Example 52 includes the non-transitory computer readable medium of example 43, wherein the adjustment to the operation of the door includes reversing a direction of movement of the panel.

Example 53 includes the non-transitory computer readable medium of example 43, wherein the adjustment to the operation of the door includes adjusting a position limit set for the panel.

Example 54 includes the non-transitory computer readable medium of example 43, wherein the adjustment to the operation of the door includes preventing the panel from moving.

Example 55 includes the non-transitory computer readable medium of example 54, wherein the preventing the panel from moving includes activating a wind lock associated with the door.

Example 56 includes the non-transitory computer readable medium of example 43, wherein the adjustment to the operation of the door includes causing the panel to move in successive increments temporally spaced by periods of non-movement, the increments being less than a full travel distance of the panel.

Example 57 includes the non-transitory computer readable medium of example 43, wherein the instructions cause the machine to detect at least a portion of a lateral edge of the panel missing from within the track based on feedback from a misfeed sensor positioned adjacent an upper end of the track.

Example 58 includes the non-transitory computer readable medium of example 57, wherein the instructions cause the machine to control operations of the door to attempt to refeed the panel into the track in response to the detection of the panel missing from within the track.

Example 59 includes the non-transitory computer readable medium of example 58, wherein the attempt to refeed the panel includes moving the panel toward an open position followed by moving the panel toward a closed position.

Example 60 includes the non-transitory computer readable medium of example 59, wherein the instructions cause the machine to reverse direction of the panel from moving toward the open position to moving toward the closed position before the panel reaches a fully open position, the reversal of direction based on feedback from the misfeed sensor indicating the panel is detected within the track.

Example 61 includes the non-transitory computer readable medium of example 59, wherein the instructions cause the machine to change a speed of movement of the door when moving the panel toward the closed position relative to a speed of movement of the door prior to detecting of the panel missing from within the track.

Example 62 includes the non-transitory computer readable medium of example 59, wherein the instructions cause the machine to wait a threshold period of time between the moving of the panel toward the open position and the moving of the panel toward the closed position.

Example 63 includes the non-transitory computer readable medium of example 59, wherein the instructions cause the machine to adjust an open limit defining a fully open position for the panel prior to moving the panel toward the open position.

Example 64 includes a method comprising controlling operations of a door, the door including a panel to move along a track, receiving feedback from a sensor, detecting, by executing an instruction with at least one processor, a surface pressure load acting on a door based on the received feedback from the sensor, and automatically adjusting, by executing an instruction with the at least one processor, an operation of the door in response to detection of the surface pressure load.

Example 65 includes the method of example 64, wherein the receiving the feedback from the sensor includes receiving data from a bag-up sensor.

Example 66 includes the method of example 64, wherein the receiving the feedback from the sensor includes receiving data from an encoder that monitors at least one of a position or a speed of rotation of a motor indicative of a at least one of a position or a speed of the panel.

Example 67 includes the method of example 66, further including detecting the surface pressure load is acting on the door when the speed of the panel is less than a commanded speed by a speed threshold.

Example 68 includes the method of example 67, further including determining a deceleration of the panel by tracking the speed of the panel over time, detecting the surface pressure load when the deceleration is less than a deceleration threshold, and determining an object is obstructing a path of the panel when the deceleration is greater than the deceleration threshold.

Example 69 includes the method of example 64, wherein the receiving the feedback from the sensor includes receiving a current drawn by a motor that drives the panel.

Example 70 includes the method of example 64, wherein receiving the feedback from the sensor includes receiving data from a surface pressure load sensor.

Example 71 includes the method of example 70, wherein the surface pressure load sensor is at least one of an anemometer, a differential pressure sensor, or an air flow sensor.

Example 72 includes the method of example 64, wherein the adjusting of the operation of the door includes commanding the panel to move at a reduced speed relative to a speed before the surface pressure load was detected.

Example 73 includes the method of example 64, wherein the adjusting of the operation of the door includes reversing a direction of movement of the panel.

Example 74 includes the method of example 64, wherein the adjusting of the operation of the door includes adjusting a position limit set for the panel.

Example 75 includes the method of example 64, wherein the adjusting of the operation of the door includes preventing the panel from moving.

Example 76 includes the method of example 75, wherein the preventing the panel from moving includes activating a wind lock associated with the door.

Example 77 includes the method of example 64, wherein the adjustment to the operation of the door includes causing the panel to move in successive increments temporally spaced by periods of non-movement, the increments being less than a full travel distance of the panel.

Example 78 includes the method of example 64, further including detecting at least a portion of a lateral edge of the panel missing from within the track based on feedback from a misfeed sensor positioned adjacent an upper end of the track.

Example 79 includes the method of example 78, further including controlling operations of the door to attempt to refeed the panel into the track in response to the detection of the panel missing from within the track.

Example 80 includes the method of example 79, wherein the attempt to refeed the panel includes moving the panel toward an open position followed by moving the panel toward a closed position.

Example 81 includes the method of example 80, further including reversing direction of the panel from moving toward the open position to moving toward the closed position before the panel reaches a fully open position, the reversal of direction based on feedback from the misfeed sensor indicating the panel is detected within the track.

Example 82 includes the method of example 80, further including changing a speed of movement of the door when moving the panel toward the closed position relative to a speed of movement of the door prior to detecting of the panel missing from within the track.

Example 83 includes the method of example 80, further including waiting a threshold period of time between the moving of the panel toward the open position and the moving of the panel toward the closed position.

Example 84 includes the method of example 80, further including adjusting an open limit defining a fully open position for the panel prior to moving the panel toward the open position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:

a panel of a door, the panel including a pliable sheet that is to move along a track;

sensor feedback analyzer circuitry to detect a surface pressure load acting on the pliable sheet based on feedback from a bag-up sensor, the bag-up sensor to detect whether the panel is bagging up;

a header housing, the bag-up sensor to be within the header housing;

a roller within the header housing, the panel to be wound around the roller when the panel is moved to an open position and to be unwound from the roller when the panel is moved to a closed position, the panel to bag up when a first portion of the panel, adjacent the roller, is being unwound from the roller while a second portion of the panel, within the track, at least one of stops moving or moves at a reduced speed relative to the first portion; and operations controller circuitry to control operations of the door, the operations controller circuitry to automatically adjust an operation of the door in response to detection of the surface pressure load.

2. The apparatus of claim 1, including an encoder to monitor at least one of a position or a speed of rotation of a motor indicative of at least one of a position or a speed of the panel.

3. The apparatus of claim 1, wherein the adjustment to the operation of the door includes commanding the panel to move at a reduced speed relative to a speed before the surface pressure load was detected.

4. The apparatus of claim 1, wherein the adjustment to the operation of the door includes reversing a direction of movement of the panel.

5. The apparatus of claim 1, wherein the adjustment to the operation of the door includes adjusting a position limit set for the panel.

6. The apparatus of claim 1, wherein the adjustment to the operation of the door includes preventing the panel from moving.

7. The apparatus of claim 6, wherein the preventing the panel from moving includes activating a wind lock associated with the door.

8. The apparatus of claim 1, wherein the adjustment to the operation of the door includes causing the panel to move in successive increments temporally spaced by periods of non-movement, the increments being less than a full travel distance of the panel.

9. The apparatus of claim 1, wherein the bag-up sensor includes a photoelectric eye sensor that transmits a beam across the header housing.

10. The apparatus of claim 9, wherein the bag-up sensor is to detect that the panel is bagging up when the first portion of the panel crosses the beam.

11. The apparatus of claim 1, wherein the bag-up sensor is to detect whether the panel is bagging up by detecting the panel deviating from a path of normal operation within the header housing.

12. The apparatus of claim 1, wherein the bag-up sensor is to detect whether the panel is bagging up by detecting the panel accumulating in an area proximate a top of the door, the area spaced apart from a roller around which the panel is to wrap when the panel is in a closed position.

13. The apparatus of claim 1, wherein the bag-up sensor includes a photoelectric eye sensor.

14. The apparatus of claim 13, wherein the track is to be mounted adjacent a wall containing a doorway the panel is to selectively block and unblock, and the photoelectric eye sensor is to transmit a beam that is to extend between the wall and the panel when the panel is closed and within a path of normal operation.

15. The apparatus of claim 13, wherein the track is to be mounted adjacent a wall containing a doorway the panel is to selectively block and unblock, and the photoelectric eye sensor is to transmit a beam that is to extend adjacent the panel when the panel is closed and within a path of normal operation, the panel to be between the beam and the wall.

16. An apparatus comprising:
- at least one memory;
- instructions; and
- processor circuitry to execute the instructions to:
  - detect a surface pressure load acting on a door based on feedback from a bag-up sensor, the door including a panel composed of a pliable sheet to move along a track, the bag-up sensor to be within a header housing and to detect whether the panel is bagging up, the panel to be wound around a roller within the header housing when the panel is moved to an open position and to be unwound from the roller when the panel is moved to a closed position, the panel to bag up when a first portion of the panel, adjacent the roller, is being unwound from the roller while a second portion of the panel, within the track, at least one of stops moving or moves at a reduced speed relative to the first portion; and
  - automatically adjust an operation of the door in response to detection of the surface pressure load.

17. A non-transitory computer readable medium comprising instructions that cause a machine to at least:
- control operations of a door, the door including a panel to move along a track, the panel defined by a pliable sheet;
- detect a surface pressure load acting on the door based on feedback from a bag-up sensor, the bag-up sensor to be within a header housing and to detect whether the panel is bagging up, the panel to be wound around a roller within the header housing when the panel is moved to an open position and to be unwound from the roller when the panel is moved to a closed position, the panel to bag up when a first portion of the panel, adjacent the roller, is being unwound from the roller while a second portion of the panel, within the track, at least one of stops moving or moves at a reduced speed relative to the first portion; and
- automatically adjust an operation of the door in response to detection of the surface pressure load.

18. A method comprising:
- controlling operations of a door, the door including a panel to move along a track, the panel including a flexible sheet;
- receiving feedback from a bag-up sensor within a header housing of the door, the bag-up sensor to detect whether the panel is bagging up, the panel to be wound around a roller within the header housing when the panel is moved to an open position and to be unwound from the roller when the panel is moved to a closed position, the panel to bag up when a first portion of the panel, adjacent the roller, is being unwound from the roller while a second portion of the panel, within the track, at least one of stops moving or moves at a reduced speed relative to the first portion;
- detecting, by executing an instruction with at least one processor, a surface pressure load acting on a door based on the feedback from the bag-up sensor; and
- automatically adjusting, by executing an instruction with the at least one processor, an operation of the door in response to detection of the surface pressure load.

19. A method comprising:
- controlling operations of a door, the door including a panel to move along a track, the panel including a flexible sheet;
- receiving feedback from a sensor;
- determining a deceleration of the panel by tracking a speed of the panel over time based on the feedback;
- detecting, by executing an instruction with at least one processor, a surface pressure load acting on a door when the deceleration is less than a deceleration threshold;
- determining an object is obstructing a path of the panel when the deceleration is greater than the deceleration threshold; and
- automatically adjusting, by executing an instruction with the at least one processor, an operation of the door in response to detection of the surface pressure load.

* * * * *